US012223814B2

(12) United States Patent
Chandramowle et al.

(10) Patent No.: US 12,223,814 B2
(45) Date of Patent: Feb. 11, 2025

(54) SECURITY TAG FOR TEXTILES USING CONDUCTIVE THREAD

(71) Applicant: Sensormatic Electronics, LLC, Boca Raton, FL (US)

(72) Inventors: Gopal Chandramowle, Boca Raton, FL (US); Hubert A. Patterson, Boca Raton, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 17/021,607

(22) Filed: Sep. 15, 2020

(65) Prior Publication Data

US 2021/0082266 A1 Mar. 18, 2021

Related U.S. Application Data

(60) Provisional application No. 62/901,215, filed on Sep. 16, 2019.

(51) Int. Cl.
*G08B 13/24* (2006.01)

(52) U.S. Cl.
CPC ..... *G08B 13/2468* (2013.01); *G08B 13/2417* (2013.01)

(58) Field of Classification Search
CPC .............. G08B 13/2445; G08B 13/248; G06K 7/10128; G06K 7/10396; G06K 19/027; A41D 1/002; A43B 3/0005; A61B 5/6804
See application file for complete search history.

(56) References Cited

U.S. PATENT DOCUMENTS

| | | | |
|---|---|---|---|
| 5,942,978 | A | 8/1999 | Shafer |
| 5,963,144 | A | 10/1999 | Kruest |
| 6,147,655 | A | 11/2000 | Roesner |
| 6,152,348 | A | 11/2000 | Finn et al. |
| 6,229,443 | B1 | 5/2001 | Roesner |
| 6,265,976 | B1 | 7/2001 | Roesner |
| 6,646,336 | B1 | 11/2003 | Marmaropoulos et al. |
| 6,690,264 | B2 | 2/2004 | Dalglish |

(Continued)

FOREIGN PATENT DOCUMENTS

| | | | |
|---|---|---|---|
| CN | 1764932 | A | 4/2006 |
| CN | 101506428 | A | 8/2009 |

(Continued)

OTHER PUBLICATIONS

Lemey Sam et al: "Wearable Flexible Lightweight Modular RFID Tag With Integrated Energy Harvester", IEEE Transactions on Microwave Theory and Techniques, Plenum, USA, vol. 64, No. 7, Jul. 1, 2016, pp. 2304-2314.

(Continued)

*Primary Examiner* — Mirza F Alam
(74) *Attorney, Agent, or Firm* — ArentFox Schiff LLP

(57) ABSTRACT

Electronic article surveillance (EAS) in which an EAS-enabled item includes a textile element and an EAS element. The EAS element includes an antenna subsystem and EAS electronic. The antenna subsystem is integrated into the textile element, where "integrated" connotes a manner of incorporation that would require damage to the item to remove by typical methods. The EAS electronics are in conductive communication with the antenna subsystem.

12 Claims, 6 Drawing Sheets

(56) References Cited

U.S. PATENT DOCUMENTS

| | | | |
|---|---|---|---|
| 6,967,579 | B1 | 11/2005 | Elizondo |
| 6,982,190 | B2 | 1/2006 | Roesner |
| 7,026,935 | B2 | 4/2006 | Diorio et al. |
| 7,026,936 | B2 | 4/2006 | Roesner |
| 7,030,786 | B2 | 4/2006 | Kaplan et al. |
| 7,038,544 | B2 | 5/2006 | Diorio et al. |
| 7,038,573 | B2 | 5/2006 | Bann |
| 7,038,603 | B2 | 5/2006 | Diorio et al. |
| 7,049,964 | B2 | 5/2006 | Hyde et al. |
| 7,054,595 | B2 | 5/2006 | Bann |
| 7,061,324 | B2 | 6/2006 | Diorio et al. |
| 7,064,653 | B2 | 6/2006 | Dalglish |
| 7,107,022 | B1 | 9/2006 | Thomas et al. |
| 7,116,240 | B2 | 10/2006 | Hyde |
| 7,119,664 | B2 | 10/2006 | Roesner |
| 7,120,550 | B2 | 10/2006 | Diorio et al. |
| 7,123,171 | B2 | 10/2006 | Kaplan et al. |
| 7,154,283 | B1 | 12/2006 | Weakley et al. |
| 7,158,408 | B2 | 1/2007 | Roesner et al. |
| 7,183,926 | B2 | 2/2007 | Diorio et al. |
| 7,187,237 | B1 | 3/2007 | Diorio et al. |
| 7,187,290 | B2 | 3/2007 | Hyde et al. |
| 7,199,456 | B2 | 4/2007 | Krappe et al. |
| 7,199,663 | B2 | 4/2007 | Diorio et al. |
| 7,212,446 | B2 | 5/2007 | Diorio et al. |
| 7,215,251 | B2 | 5/2007 | Hyde |
| D543,976 | S | 6/2007 | Oliver |
| D546,819 | S | 7/2007 | Oliver |
| D546,820 | S | 7/2007 | Oliver |
| D546,821 | S | 7/2007 | Oliver |
| D546,822 | S | 7/2007 | Oliver |
| D547,306 | S | 7/2007 | Oliver |
| D547,754 | S | 7/2007 | Oliver |
| 7,245,213 | B1 | 7/2007 | Esterberg et al. |
| 7,246,751 | B2 | 7/2007 | Diorio et al. |
| D548,225 | S | 8/2007 | Oliver |
| 7,253,719 | B2 | 8/2007 | Diorio et al. |
| 7,253,735 | B2 | 8/2007 | Gengel et al. |
| 7,283,037 | B2 | 10/2007 | Diorio et al. |
| 7,304,579 | B2 | 12/2007 | Diorio et al. |
| 7,307,528 | B2 | 12/2007 | Glidden et al. |
| 7,307,529 | B2 | 12/2007 | Gutnik et al. |
| 7,307,534 | B2 | 12/2007 | Pesavento |
| 7,312,622 | B2 | 12/2007 | Hyde et al. |
| D562,810 | S | 2/2008 | Oliver |
| D563,397 | S | 3/2008 | Oliver |
| 7,375,626 | B2 | 5/2008 | Ening |
| 7,380,190 | B2 | 5/2008 | Hara et al. |
| D570,337 | S | 6/2008 | Oliver |
| 7,382,257 | B2 | 6/2008 | Thomas et al. |
| 7,388,468 | B2 | 6/2008 | Diorio et al. |
| 7,389,101 | B2 | 6/2008 | Diorio et al. |
| 7,391,329 | B2 | 6/2008 | Humes et al. |
| 7,394,324 | B2 | 7/2008 | Diorio et al. |
| 7,400,255 | B2 | 7/2008 | Horch |
| 7,405,659 | B1 | 7/2008 | Hyde |
| 7,405,660 | B2 | 7/2008 | Diorio et al. |
| D574,369 | S | 8/2008 | Oliver |
| D574,370 | S | 8/2008 | Oliver |
| 7,408,466 | B2 | 8/2008 | Diorio et al. |
| 7,417,548 | B2 | 8/2008 | Kavounas et al. |
| 7,419,096 | B2 | 9/2008 | Esterberg et al. |
| 7,420,469 | B1 | 9/2008 | Oliver |
| 7,423,539 | B2 | 9/2008 | Hyde et al. |
| D578,114 | S | 10/2008 | Oliver |
| 7,432,814 | B2 | 10/2008 | Dietrich et al. |
| 7,436,308 | B2 | 10/2008 | Sundstrom et al. |
| 7,448,547 | B2 | 11/2008 | Esterberg |
| 7,469,126 | B2 | 12/2008 | Miettinen et al. |
| 7,472,835 | B2 | 1/2009 | Diorio et al. |
| D586,336 | S | 2/2009 | Oliver |
| 7,489,248 | B2 | 2/2009 | Gengel et al. |
| 7,492,164 | B2 | 2/2009 | Hanhikorpi et al. |
| D587,691 | S | 3/2009 | Oliver |
| 7,501,953 | B2 | 3/2009 | Diorio et al. |
| 7,510,117 | B2 | 3/2009 | Esterberg |
| 7,518,516 | B2 | 4/2009 | Azevedo et al. |
| 7,525,438 | B2 | 4/2009 | Hyde et al. |
| D592,192 | S | 5/2009 | Oliver |
| 7,528,724 | B2 | 5/2009 | Horch |
| 7,528,728 | B2 | 5/2009 | Oliver et al. |
| 7,541,843 | B1 | 6/2009 | Hyde et al. |
| 7,561,866 | B2 | 7/2009 | Oliver et al. |
| 7,589,618 | B2 | 9/2009 | Diorio et al. |
| 7,592,897 | B2 | 9/2009 | Diorio et al. |
| D605,641 | S | 12/2009 | Oliver |
| D606,056 | S | 12/2009 | Oliver |
| D606,057 | S | 12/2009 | Oliver |
| 7,633,376 | B2 | 12/2009 | Diorio et al. |
| 7,651,882 | B1 | 1/2010 | Bockorick et al. |
| D610,576 | S | 2/2010 | Oliver |
| 7,667,231 | B2 | 2/2010 | Hyde et al. |
| 7,667,589 | B2 | 2/2010 | Desmons et al. |
| D611,037 | S | 3/2010 | Oliver |
| 7,679,957 | B2 | 3/2010 | Ma et al. |
| D613,276 | S | 4/2010 | Oliver |
| 7,696,882 | B1 | 4/2010 | Rahimi et al. |
| 7,696,947 | B2 | 4/2010 | Gallschuetz et al. |
| 7,714,593 | B2 | 5/2010 | Varpula et al. |
| 7,715,236 | B2 | 5/2010 | Hyde |
| 7,719,406 | B2 | 5/2010 | Bajahr |
| D617,320 | S | 6/2010 | Oliver |
| 7,733,227 | B1 | 6/2010 | Pesavento et al. |
| D620,484 | S | 7/2010 | Oliver |
| D620,928 | S | 8/2010 | Oliver |
| 7,768,248 | B1 | 8/2010 | Hyde |
| 7,768,406 | B1 | 8/2010 | Peach et al. |
| 7,787,837 | B2 | 8/2010 | Mikuteit |
| 7,804,411 | B2 | 9/2010 | Copeland |
| 7,808,387 | B1 | 10/2010 | Kuhn |
| 7,808,823 | B2 | 10/2010 | Ma et al. |
| 7,812,729 | B2 | 10/2010 | Copeland |
| 7,830,262 | B1 | 11/2010 | Diorio et al. |
| 7,830,322 | B1 | 11/2010 | Oliver et al. |
| 7,843,399 | B2 | 11/2010 | Stobbe |
| 7,872,582 | B1 | 1/2011 | Diorio |
| 7,884,725 | B2 | 2/2011 | Kruest et al. |
| 7,907,899 | B1 | 3/2011 | Oliver |
| 7,917,088 | B2 | 3/2011 | Hyde et al. |
| 7,920,046 | B1 | 4/2011 | Aiouaz et al. |
| 7,969,307 | B2 | 6/2011 | Peeters |
| 7,969,364 | B2 | 6/2011 | Kriebel et al. |
| 7,973,643 | B2 | 7/2011 | Hyde et al. |
| 7,973,645 | B1 | 7/2011 | Moretti et al. |
| 7,973,661 | B2 | 7/2011 | Copeland |
| 7,975,414 | B2 | 7/2011 | Ritamäki et al. |
| 7,978,005 | B1 | 7/2011 | Hyde et al. |
| 7,982,611 | B1 | 7/2011 | Picasso et al. |
| 7,990,249 | B1 | 8/2011 | Hyde et al. |
| 7,994,897 | B2 | 8/2011 | Azevedo et al. |
| 7,999,675 | B2 | 8/2011 | Diorio et al. |
| 8,028,923 | B2 | 10/2011 | Shafran et al. |
| 8,044,774 | B1 | 10/2011 | Diorio |
| 8,044,801 | B1 | 10/2011 | Hyde et al. |
| 8,056,814 | B2 | 11/2011 | Martin et al. |
| 8,063,740 | B1 | 11/2011 | Diorio et al. |
| 8,072,327 | B2 | 12/2011 | Enyedy et al. |
| 8,072,329 | B1 | 12/2011 | Srinivas et al. |
| 8,072,332 | B2 | 12/2011 | Forster |
| 8,077,013 | B2 | 12/2011 | Cooper |
| 8,082,556 | B1 | 12/2011 | Aiouaz et al. |
| 8,093,617 | B2 | 1/2012 | Vicard et al. |
| 8,093,996 | B2 | 1/2012 | Heurtier |
| 8,098,134 | B2 | 1/2012 | Azevedo et al. |
| 8,115,590 | B1 | 2/2012 | Diorio et al. |
| 8,115,597 | B1 | 2/2012 | Oliver et al. |
| 8,115,632 | B1 | 2/2012 | Rahimi et al. |
| 8,120,494 | B1 | 2/2012 | Aiouaz et al. |
| 8,134,451 | B1 | 3/2012 | Diorio |
| 8,154,385 | B2 | 4/2012 | Aiouaz et al. |
| 8,174,367 | B1 | 5/2012 | Diorio |
| 8,179,265 | B2 | 5/2012 | Elizondo et al. |
| 8,188,867 | B2 | 5/2012 | Rietzler |
| 8,188,927 | B1 | 5/2012 | Koepp et al. |

(56) References Cited

U.S. PATENT DOCUMENTS

| | | | |
|---|---|---|---|
| 8,193,912 | B1 | 6/2012 | Gutnik et al. |
| 8,201,748 | B2 | 6/2012 | Koepp et al. |
| 8,224,610 | B2 | 7/2012 | Diorio et al. |
| 8,228,175 | B1 | 7/2012 | Diorio et al. |
| 8,237,562 | B1 | 8/2012 | Picasso et al. |
| 8,244,201 | B2 | 8/2012 | Oliver et al. |
| 8,258,918 | B1 | 9/2012 | Diorio et al. |
| 8,258,955 | B1 | 9/2012 | Hyde et al. |
| 8,260,241 | B1 | 9/2012 | Hyde |
| 8,279,045 | B2 | 10/2012 | Diorio et al. |
| 8,294,582 | B1 | 10/2012 | Humes et al. |
| 8,303,389 | B2 | 11/2012 | Wilm |
| 8,305,764 | B2 | 11/2012 | Rietzler |
| 8,325,014 | B1 | 12/2012 | Sundstrom et al. |
| 8,325,042 | B1 | 12/2012 | Hyde et al. |
| 8,326,256 | B1 | 12/2012 | Kuhn |
| 8,334,751 | B2 | 12/2012 | Azevedo et al. |
| 8,342,402 | B2 | 1/2013 | Kriebel et al. |
| 8,344,857 | B1 | 1/2013 | Oliver et al. |
| 8,350,665 | B1 | 1/2013 | Sundstrom et al. |
| 8,350,702 | B2 | 1/2013 | Copeland et al. |
| 8,354,917 | B2 | 1/2013 | Diorio et al. |
| 8,390,425 | B1 | 3/2013 | Cooper et al. |
| 8,390,430 | B1 | 3/2013 | Sundstrom et al. |
| 8,390,431 | B1 | 3/2013 | Diorio |
| 8,391,785 | B2 | 3/2013 | Hyde et al. |
| 8,427,315 | B2 | 4/2013 | Aiouaz et al. |
| 8,428,515 | B1 | 4/2013 | Oliver |
| 8,446,258 | B2 | 5/2013 | Diorio et al. |
| 8,448,874 | B2 | 5/2013 | Koskelainen |
| 8,451,095 | B2 | 5/2013 | Azevedo et al. |
| 8,451,119 | B1 | 5/2013 | Rahimi et al. |
| 8,451,673 | B1 | 5/2013 | Pesavento et al. |
| 8,471,708 | B1 | 6/2013 | Diorio et al. |
| 8,471,773 | B2 | 6/2013 | Vicard et al. |
| 8,511,569 | B1 | 8/2013 | Koepp et al. |
| 8,536,075 | B2 | 9/2013 | Leonard |
| 8,570,157 | B1 | 10/2013 | Diorio et al. |
| 8,587,411 | B1 | 11/2013 | Diorio |
| 8,593,257 | B1 | 11/2013 | Diorio et al. |
| D695,278 | S | 12/2013 | Koskelainen |
| 8,600,298 | B1 | 12/2013 | Hyde et al. |
| 8,610,580 | B2 | 12/2013 | Elizondo et al. |
| 8,614,506 | B1 | 12/2013 | Fassett et al. |
| 8,616,459 | B2 | 12/2013 | Sykko et al. |
| 8,661,652 | B1 | 3/2014 | Koepp et al. |
| 8,665,074 | B1 | 3/2014 | Diorio et al. |
| 8,669,872 | B1 | 3/2014 | Stanford et al. |
| 8,669,874 | B2 | 3/2014 | Kruest et al. |
| 8,680,973 | B2 | 3/2014 | Kruest et al. |
| 8,698,629 | B1 | 4/2014 | Stanford et al. |
| 8,717,145 | B2 | 5/2014 | Ho et al. |
| D710,337 | S | 8/2014 | Koskelainen |
| 8,796,865 | B1 | 8/2014 | Fassett et al. |
| 8,810,376 | B1 | 8/2014 | Picasso et al. |
| 8,814,054 | B2 | 8/2014 | Brun et al. |
| 8,816,909 | B2 | 8/2014 | Jiang et al. |
| 8,830,038 | B1 | 9/2014 | Stanford et al. |
| 8,830,064 | B1 | 9/2014 | Stanford et al. |
| 8,830,065 | B1 | 9/2014 | Stanford et al. |
| 8,866,594 | B1 | 10/2014 | Diorio et al. |
| 8,866,595 | B1 | 10/2014 | Diorio et al. |
| 8,866,596 | B1 | 10/2014 | Diorio et al. |
| 8,872,636 | B1 | 10/2014 | Diorio et al. |
| 8,881,373 | B1 | 11/2014 | Koepp et al. |
| 8,902,627 | B1 | 12/2014 | Pesavento et al. |
| 8,907,795 | B2 | 12/2014 | Soto et al. |
| 8,917,179 | B2 | 12/2014 | Alicot et al. |
| 8,917,219 | B2 | 12/2014 | Semar et al. |
| 8,952,792 | B1 | 2/2015 | Srinivas et al. |
| 8,967,486 | B2 | 3/2015 | Chandramowle et al. |
| 8,988,199 | B1 | 3/2015 | Moretti et al. |
| 8,991,714 | B2 | 3/2015 | Elizondo et al. |
| 8,998,097 | B2 | 4/2015 | Launiainen |
| 9,000,835 | B1 | 4/2015 | Peach et al. |
| D729,780 | S | 5/2015 | Koskelainen et al. |
| 9,024,729 | B1 | 5/2015 | Diorio et al. |
| 9,024,731 | B1 | 5/2015 | Diorio et al. |
| 9,031,504 | B1 | 5/2015 | Hyde et al. |
| 9,035,748 | B2 | 5/2015 | Greefkes |
| 9,053,400 | B2 | 6/2015 | Diorio et al. |
| 9,058,554 | B2 | 6/2015 | Kervinen et al. |
| 9,064,196 | B1 | 6/2015 | Gutnik et al. |
| 9,064,199 | B2 | 6/2015 | Nitta |
| 9,070,066 | B1 | 6/2015 | Oliver et al. |
| 9,076,049 | B1 | 7/2015 | Moretti et al. |
| 9,087,281 | B2 | 7/2015 | Maguire et al. |
| 9,087,282 | B1 | 7/2015 | Hyde et al. |
| 9,104,923 | B1 | 8/2015 | Stanford et al. |
| 9,111,283 | B1 | 8/2015 | Diorio et al. |
| 9,129,168 | B1 | 9/2015 | Diorio et al. |
| 9,129,169 | B1 | 9/2015 | Diorio et al. |
| 9,135,476 | B2 | 9/2015 | Virtanen |
| 9,142,881 | B1 | 9/2015 | Oliver et al. |
| 9,165,170 | B1 | 10/2015 | Gutnik et al. |
| 9,178,277 | B1 | 11/2015 | Moretti et al. |
| 9,183,717 | B1 | 11/2015 | Diorio et al. |
| 9,189,904 | B1 | 11/2015 | Diorio et al. |
| 9,197,294 | B2 | 11/2015 | Alicot et al. |
| 9,202,093 | B2 | 12/2015 | Nummila et al. |
| 9,213,870 | B1 | 12/2015 | Diorio et al. |
| 9,213,871 | B1 | 12/2015 | Diorio et al. |
| 9,215,809 | B2 | 12/2015 | Nieland et al. |
| 9,239,941 | B1 | 1/2016 | Diorio |
| 9,247,634 | B2 | 1/2016 | Kruest et al. |
| 9,253,876 | B2 | 2/2016 | Elizondo et al. |
| 9,281,552 | B2 | 3/2016 | Virtanen |
| 9,299,586 | B1 | 3/2016 | West et al. |
| 9,305,195 | B1 | 4/2016 | Diorio et al. |
| 9,317,799 | B1 | 4/2016 | Koepp et al. |
| 9,325,053 | B2 | 4/2016 | Virtanen et al. |
| 9,330,284 | B1 | 5/2016 | Diorio |
| 9,342,775 | B2 | 5/2016 | Forster |
| 9,349,032 | B1 | 5/2016 | Diorio et al. |
| 9,349,090 | B1 | 5/2016 | Srinivas et al. |
| 9,373,012 | B2 | 6/2016 | Pesavento et al. |
| 9,390,603 | B2 | 7/2016 | Li et al. |
| 9,405,945 | B1 | 8/2016 | Diorio et al. |
| 9,430,683 | B1 | 8/2016 | Hyde |
| 9,454,680 | B1 | 9/2016 | Diorio |
| 9,460,380 | B1 | 10/2016 | Koepp et al. |
| 9,471,816 | B1 | 10/2016 | Hyde et al. |
| 9,489,611 | B1 | 11/2016 | Diorio et al. |
| 9,495,631 | B1 | 11/2016 | Koepp et al. |
| 9,501,675 | B1 | 11/2016 | Diorio et al. |
| 9,501,736 | B2 | 11/2016 | Elizondo et al. |
| 9,503,160 | B1 | 11/2016 | Hyde |
| 9,542,636 | B2 | 1/2017 | Buehler |
| 9,565,022 | B1 | 2/2017 | Robshaw et al. |
| 9,582,690 | B2 | 2/2017 | Rietzler |
| 9,589,224 | B2 | 3/2017 | Patterson et al. |
| 9,607,191 | B1 | 3/2017 | Peach et al. |
| 9,607,286 | B1 | 3/2017 | Diorio |
| 9,626,617 | B2 | 4/2017 | Martin et al. |
| 9,626,619 | B2 | 4/2017 | Kruest et al. |
| 9,633,302 | B1 | 4/2017 | Heinrich |
| 9,646,186 | B1 | 5/2017 | Hyde et al. |
| 9,652,643 | B1 | 5/2017 | Pesavento et al. |
| 9,690,949 | B1 | 6/2017 | Diorio et al. |
| 9,691,243 | B1 | 6/2017 | Diorio et al. |
| 9,697,387 | B1 | 7/2017 | Bowman et al. |
| 9,715,605 | B1 | 7/2017 | Sundstrom et al. |
| 9,740,891 | B1 | 8/2017 | Robshaw et al. |
| 9,747,542 | B2 | 8/2017 | Elizondo et al. |
| 9,767,333 | B1 | 9/2017 | Diorio et al. |
| 9,773,133 | B2 | 9/2017 | Oliver et al. |
| 9,773,201 | B2 | 9/2017 | Shafran et al. |
| 9,779,599 | B2 | 10/2017 | Sharpy et al. |
| 9,792,472 | B1 | 10/2017 | Robshaw et al. |
| 9,792,543 | B2 | 10/2017 | Kuschewski et al. |
| 9,805,223 | B1 | 10/2017 | Bowman et al. |
| 9,805,235 | B2 | 10/2017 | Kruest et al. |
| 9,818,084 | B1 | 11/2017 | Diorio et al. |
| 9,831,724 | B2 | 11/2017 | Copeland et al. |

(56) References Cited

U.S. PATENT DOCUMENTS 9,846,794 B2 12/2017 Greefkes
9,846,833 B1 12/2017 Koepp et al.
9,852,319 B1 12/2017 Pesavento et al.
9,875,438 B1 1/2018 Diorio et al.
9,881,186 B1 1/2018 Sundstrom et al.
9,881,473 B1 1/2018 Diorio et al.
9,886,658 B1 2/2018 Stanford et al.
9,887,843 B1 2/2018 Robshaw et al.
9,911,017 B2 3/2018 Uhl et al.
9,911,018 B1 3/2018 Heinrich et al.
9,916,483 B1 3/2018 Robshaw et al.
9,916,484 B2 3/2018 Pesavento et al.
9,922,215 B2 3/2018 Huhtasalo et al.
9,928,388 B1 3/2018 Bowman et al.
9,928,390 B1 3/2018 Diorio et al.
9,940,490 B1 4/2018 Robshaw et al.
9,953,198 B2 4/2018 Kohler et al.
9,954,278 B1 4/2018 Moretti et al.
9,959,435 B1 5/2018 Diorio et al.
9,959,494 B1 5/2018 Shyamkumar et al.
9,977,932 B2 5/2018 Rietzler
10,002,266 B1 6/2018 Hyde et al.
10,013,587 B1 7/2018 Pesavento et al.
10,037,444 B1 7/2018 Sundstrom et al.
10,043,046 B1 8/2018 Robshaw et al.
10,049,317 B1 8/2018 Diorio et al.
10,061,950 B1 8/2018 Pesavento et al.
10,068,167 B2 9/2018 Huhtasalo
10,084,597 B1 9/2018 Robshaw et al.
10,089,478 B1 10/2018 Fraser et al.
10,116,033 B1 10/2018 Koepp et al.
10,121,033 B1 11/2018 Robshaw et al.
10,133,894 B2 11/2018 Kruest et al.
10,146,969 B1 12/2018 Diorio et al.
10,169,625 B1 1/2019 Diorio et al.
10,186,127 B1 1/2019 Diorio et al.
10,204,245 B1 2/2019 Diorio et al.
10,204,246 B1 2/2019 Maguire et al.
10,235,545 B2 3/2019 Kruest et al.
10,262,167 B2 4/2019 Nyalamadugu et al.
10,311,351 B1 6/2019 Diorio et al.
10,311,353 B1 6/2019 Diorio et al.
10,318,857 B1 6/2019 Lai et al.
10,325,125 B1 6/2019 Pesavento et al.
10,331,993 B1 6/2019 Koepp et al.
10,339,436 B2 7/2019 Huhtasalo
10,373,038 B1 8/2019 Stanford
10,373,115 B1 8/2019 Diorio et al.
10,402,710 B1 9/2019 Diorio et al.
10,417,085 B1 9/2019 Diorio
10,417,464 B2 9/2019 Huhtasalo et al.
10,430,623 B1 10/2019 Pesavento et al.
10,445,535 B1 10/2019 Hyde et al.
D865,726 S 11/2019 Oliver
10,474,851 B2 11/2019 Greefkes
RE47,755 E 12/2019 Hyde et al.
10,521,768 B1 12/2019 Diorio et al.
10,546,162 B1 1/2020 Diorio
10,558,828 B2 2/2020 Martinez De Velasco Cortina et al.
10,572,703 B1 2/2020 Shyamkumar et al.
10,572,789 B1 2/2020 Stanford et al.
D879,077 S 3/2020 Oliver
10,600,298 B1 3/2020 Diorio et al.
10,650,201 B1 5/2020 Maguire et al.
10,650,202 B1 5/2020 Robshaw et al.
10,650,346 B1 5/2020 Pesavento et al.
10,664,670 B1 5/2020 Diorio et al.
D887,400 S 6/2020 Oliver
10,679,019 B1 6/2020 Thomas et al.
10,679,115 B2 6/2020 Huhtasalo
10,699,178 B1 6/2020 Diorio et al.
10,713,453 B1 7/2020 Diorio et al.
10,713,549 B1 7/2020 Peach et al.
10,719,671 B1 7/2020 Robshaw et al.
10,720,700 B1 7/2020 Moretti et al.
10,733,395 B1 8/2020 Diorio et al.
10,740,574 B1 8/2020 Stanford et al.
10,776,198 B1 9/2020 Diorio
10,783,424 B1 9/2020 Trivelpiece et al.
10,790,160 B2 9/2020 Singleton et al.
10,819,319 B1 10/2020 Hyde
10,824,824 B1 11/2020 Diorio
10,846,583 B1 11/2020 Koepp et al.
10,860,819 B1 12/2020 Pesavento et al.
10,878,371 B1 12/2020 Stanford et al.
10,878,685 B1 12/2020 Diorio et al.
10,885,417 B1 1/2021 Stanford et al.
10,885,421 B1 1/2021 Diorio et al.
10,902,308 B2 1/2021 Gire et al.
10,916,114 B1 2/2021 Diorio et al.
10,929,734 B1 2/2021 Hyde et al.
10,936,929 B1 3/2021 Diorio et al.
10,956,693 B1 3/2021 Shyamkumar et al.
10,995,523 B2 5/2021 Claeys et al.
11,017,187 B1 5/2021 Thomas et al.
11,017,349 B1 5/2021 Diorio et al.
11,024,936 B1 6/2021 Koepp et al.
11,062,190 B1 7/2021 Diorio et al.
11,107,034 B1 8/2021 Pesavento et al.
D929,975 S 9/2021 Abdul Rahman
11,120,320 B1 9/2021 Robshaw et al.
11,132,589 B2 9/2021 Chandramowle et al.
11,188,803 B1 11/2021 Patil et al.
11,200,387 B1 12/2021 Stanford et al.
11,232,340 B1 1/2022 Diorio et al.
11,244,282 B1 2/2022 Diorio et al.
11,259,443 B1 2/2022 T. Kunasekaran et al.
11,282,357 B2 3/2022 Claeys et al.
11,288,564 B1 3/2022 Koepp et al.
11,300,467 B2 4/2022 Boellaard et al.
11,321,547 B1 5/2022 Pesavento et al.
11,341,343 B1 5/2022 Diorio
11,341,837 B1 5/2022 Diorio et al.
11,361,174 B1 6/2022 Robshaw et al.
11,403,505 B1 8/2022 Diorio et al.
11,423,278 B1 8/2022 Koepp et al.
11,443,160 B2 9/2022 Trivelpiece et al.
11,461,570 B1 10/2022 Shyamkumar et al.
11,481,591 B1 10/2022 Peach et al.
11,481,592 B1 10/2022 Diorio et al.
11,514,254 B1 11/2022 Diorio
11,514,255 B1 11/2022 Thomas et al.
11,519,200 B2 12/2022 Claeys et al.
2001/0034063 A1 10/2001 Saunders et al.
2002/0088154 A1 7/2002 Sandt et al.
2002/0097143 A1 7/2002 Dalglish
2002/0100547 A1 8/2002 Takahashi et al.
2003/0136503 A1 7/2003 Green et al.
2003/0160732 A1 8/2003 Van Heerden et al.
2004/0026754 A1 2/2004 Liu et al.
2004/0125040 A1 7/2004 Ferguson et al.
2004/0192011 A1 9/2004 Roesner
2004/0195593 A1 10/2004 Diorio et al.
2004/0200061 A1 10/2004 Coleman et al.
2005/0001785 A1 1/2005 Ferguson et al.
2005/0052281 A1 3/2005 Bann
2005/0054293 A1 3/2005 Bann
2005/0057341 A1 3/2005 Roesner
2005/0058292 A1 3/2005 Diorio et al.
2005/0068179 A1 3/2005 Roesner
2005/0068180 A1 3/2005 Miettinen et al.
2005/0093690 A1 5/2005 Miglionico
2005/0099269 A1 5/2005 Diorio et al.
2005/0099270 A1 5/2005 Diorio et al.
2005/0140448 A1 6/2005 Diorio et al.
2005/0140449 A1 6/2005 Diorio et al.
2005/0162233 A1 7/2005 Diorio et al.
2005/0185460 A1 8/2005 Roesner et al.
2005/0200402 A1 9/2005 Diorio et al.
2005/0200415 A1 9/2005 Diorio et al.
2005/0200416 A1 9/2005 Diorio et al.
2005/0200417 A1 9/2005 Diorio et al.
2005/0212674 A1 9/2005 Desmons et al.

(56) References Cited

U.S. PATENT DOCUMENTS

2005/0223286 A1 10/2005 Forster
2005/0225433 A1 10/2005 Diorio et al.
2005/0225434 A1 10/2005 Diorio et al.
2005/0225435 A1 10/2005 Diorio et al.
2005/0225436 A1 10/2005 Diorio et al.
2005/0225447 A1 10/2005 Diorio et al.
2005/0237157 A1 10/2005 Cooper et al.
2005/0237158 A1 10/2005 Cooper et al.
2005/0237159 A1 10/2005 Cooper et al.
2005/0237162 A1 10/2005 Hyde et al.
2005/0237843 A1 10/2005 Hyde
2005/0237844 A1 10/2005 Hyde
2005/0240369 A1 10/2005 Diorio et al.
2005/0240370 A1 10/2005 Diorio et al.
2005/0240739 A1 10/2005 Pesavento
2005/0269408 A1 12/2005 Esterberg et al.
2005/0270141 A1 12/2005 Dalglish
2005/0270185 A1 12/2005 Esterberg
2005/0270189 A1 12/2005 Kaplan et al.
2005/0275533 A1 12/2005 Hanhikorpi et al.
2005/0280505 A1 12/2005 Humes et al.
2005/0280506 A1 12/2005 Lobanov et al.
2005/0280507 A1 12/2005 Diorio et al.
2005/0282495 A1 12/2005 Forster
2006/0033622 A1 2/2006 Hyde et al.
2006/0043198 A1 3/2006 Forster
2006/0044769 A1 3/2006 Forster et al.
2006/0049917 A1 3/2006 Hyde et al.
2006/0049928 A1 3/2006 Ening
2006/0055620 A1 3/2006 Oliver et al.
2006/0063323 A1 3/2006 Munn
2006/0071758 A1 4/2006 Cooper et al.
2006/0071759 A1 4/2006 Cooper et al.
2006/0071793 A1 4/2006 Pesavento
2006/0071796 A1 4/2006 Korzeniewski
2006/0082442 A1 4/2006 Sundstrom
2006/0086810 A1 4/2006 Diorio et al.
2006/0098765 A1 5/2006 Thomas et al.
2006/0125505 A1 6/2006 Glidden et al.
2006/0125506 A1 6/2006 Hara et al.
2006/0125507 A1 6/2006 Hyde et al.
2006/0125508 A1 6/2006 Glidden et al.
2006/0125641 A1 6/2006 Forster
2006/0133140 A1 6/2006 Gutnik et al.
2006/0133175 A1 6/2006 Gutnik et al.
2006/0145710 A1 7/2006 Puleston et al.
2006/0145855 A1 7/2006 Diorio et al.
2006/0145861 A1 7/2006 Forster et al.
2006/0145864 A1 7/2006 Jacober et al.
2006/0163370 A1 7/2006 Diorio et al.
2006/0164214 A1 7/2006 Bajahr
2006/0186960 A1 8/2006 Diorio et al.
2006/0187031 A1 8/2006 Moretti et al.
2006/0187094 A1 8/2006 Kaplan et al.
2006/0197668 A1 9/2006 Oliver et al.
2006/0199551 A1 9/2006 Thomas et al.
2006/0202705 A1 9/2006 Forster
2006/0202831 A1 9/2006 Horch
2006/0206277 A1 9/2006 Horch
2006/0211386 A1 9/2006 Thomas et al.
2006/0220639 A1 10/2006 Hyde
2006/0220865 A1 10/2006 Babine et al.
2006/0221715 A1 10/2006 Ma et al.
2006/0224647 A1 10/2006 Gutnik
2006/0226982 A1 10/2006 Forster
2006/0226983 A1 10/2006 Forster et al.
2006/0236203 A1 10/2006 Diorio et al.
2006/0238345 A1 10/2006 Ferguson et al.
2006/0244598 A1 11/2006 Hyde et al.
2006/0250245 A1 11/2006 Forster
2006/0250246 A1 11/2006 Forster
2006/0252182 A1 11/2006 Wang et al.
2006/0261952 A1 11/2006 Kavounas et al.
2006/0261953 A1 11/2006 Diorio et al.
2006/0261954 A1 11/2006 Dietrich et al.
2006/0261955 A1 11/2006 Humes et al.
2006/0261956 A1 11/2006 Sundstrom et al.
2006/0271328 A1 11/2006 Forster
2006/0273170 A1 12/2006 Forster et al.
2007/0001856 A1 1/2007 Diorio et al.
2007/0008238 A1 1/2007 Liu et al.
2007/0024446 A1 2/2007 Hyde et al.
2007/0035466 A1 2/2007 Coleman et al.
2007/0039687 A1 2/2007 Hamilton et al.
2007/0046432 A1 3/2007 Aiouaz et al.
2007/0052613 A1 3/2007 Gallschuetz et al.
2007/0060075 A1 3/2007 Mikuteit
2007/0085685 A1 4/2007 Phaneuf et al.
2007/0109129 A1 5/2007 Sundstrom et al.
2007/0126584 A1 6/2007 Hyde et al.
2007/0136583 A1 6/2007 Diorio et al.
2007/0136584 A1 6/2007 Diorio et al.
2007/0136585 A1 6/2007 Diorio et al.
2007/0141760 A1 6/2007 Ferguson et al.
2007/0144662 A1 6/2007 Armijo et al.
2007/0152073 A1 7/2007 Esterberg
2007/0156281 A1 7/2007 Leung et al.
2007/0164851 A1 7/2007 Cooper
2007/0171129 A1 7/2007 Coleman et al.
2007/0172966 A1 7/2007 Hyde et al.
2007/0177738 A1 8/2007 Diorio et al.
2007/0180009 A1 8/2007 Gutnik
2007/0216533 A1 9/2007 Hyde et al.
2007/0218571 A1 9/2007 Stoughton et al.
2007/0220737 A1 9/2007 Stoughton et al.
2007/0221737 A2 9/2007 Diorio et al.
2007/0236331 A1 10/2007 Thompson et al.
2007/0236335 A1 10/2007 Aiouaz et al.
2007/0241762 A1 10/2007 Varpula et al.
2007/0296590 A1 12/2007 Diorio et al.
2007/0296603 A1 12/2007 Diorio et al.
2008/0006702 A2 1/2008 Diorio et al.
2008/0018489 A1 1/2008 Kruest et al.
2008/0024273 A1 1/2008 Kruest et al.
2008/0030342 A1 2/2008 Elizondo et al.
2008/0046492 A1 2/2008 Sundstrom
2008/0048833 A1 2/2008 Oliver
2008/0048867 A1 2/2008 Oliver et al.
2008/0084275 A1 4/2008 Azevedo et al.
2008/0094214 A1 4/2008 Azevedo et al.
2008/0136602 A1 6/2008 Ma et al.
2008/0180217 A1 7/2008 Isabell
2008/0180255 A1 7/2008 Isabell
2008/0197978 A1 8/2008 Diorio et al.
2008/0197979 A1 8/2008 Enyedy et al.
2008/0204195 A1 8/2008 Diorio et al.
2008/0232883 A1 9/2008 Klein et al.
2008/0232894 A1 9/2008 Neuhard
2008/0258878 A1 10/2008 Dietrich et al.
2008/0258916 A1 10/2008 Diorio et al.
2008/0266098 A1 10/2008 Aiouaz et al.
2008/0297421 A1 12/2008 Kriebel et al.
2008/0314990 A1 12/2008 Rietzler
2008/0315992 A1 12/2008 Forster
2009/0002132 A1 1/2009 Diorio et al.
2009/0015382 A1 1/2009 Greefkes
2009/0027173 A1 1/2009 Forster
2009/0033495 A1 2/2009 Abraham et al.
2009/0038735 A1 2/2009 Kian
2009/0065592 A1 3/2009 Paul et al.
2009/0091424 A1 4/2009 Rietzler
2009/0123704 A1 5/2009 Shafran et al.
2009/0146785 A1 6/2009 Forster
2009/0184824 A1 7/2009 Forster
2009/0189770 A1 7/2009 Wirrig et al.
2009/0194588 A1 8/2009 Blanchard et al.
2009/0200066 A1 8/2009 Vicard et al.
2009/0212919 A1 8/2009 Selgrath et al.
2009/0237220 A1 9/2009 Oliver et al.
2009/0251293 A1 10/2009 Azevedo et al.
2010/0032900 A1 2/2010 Wilm
2010/0033297 A1 2/2010 Patovirta
2010/0043266 A1 2/2010 Pedicano
2010/0050487 A1 3/2010 Weightman et al.

(56) References Cited

U.S. PATENT DOCUMENTS

2010/0060456 A1 3/2010 Forster
2010/0060459 A1 3/2010 Stole et al.
2010/0079286 A1 4/2010 Phaneuf
2010/0079287 A1 4/2010 Forster et al.
2010/0079290 A1 4/2010 Phaneuf
2010/0126000 A1 5/2010 Forster
2010/0155492 A1 6/2010 Forster
2010/0156640 A1 6/2010 Forster
2010/0182129 A1 7/2010 Hyde et al.
2010/0226107 A1 9/2010 Rietzler
2010/0230500 A1 9/2010 Wilkinson
2010/0245182 A1 9/2010 Vicard et al.
2010/0259392 A1 10/2010 Chamandy et al.
2010/0270382 A1 10/2010 Koepp et al.
2011/0000970 A1 1/2011 Abraham
2011/0062236 A1 3/2011 Kriebel et al.
2011/0114734 A1 5/2011 Tiedmann et al.
2011/0121082 A1 5/2011 Phaneuf
2011/0121972 A1 5/2011 Phaneuf et al.
2011/0155811 A1 6/2011 Rietzler
2011/0155813 A1 6/2011 Forster
2011/0160548 A1 6/2011 Forster
2011/0163849 A1 7/2011 Kruest et al.
2011/0163879 A1 7/2011 Kruest et al.
2011/0175735 A1 7/2011 Forster
2011/0185607 A1 8/2011 Forster et al.
2011/0253794 A1 10/2011 Koskelainen
2011/0256357 A1 10/2011 Forster
2011/0267254 A1 11/2011 Semar et al.
2011/0285511 A1 11/2011 Maguire et al.
2011/0289023 A1 11/2011 Forster et al.
2011/0289647 A1 12/2011 Chiao et al.
2011/0303751 A1 12/2011 Lai et al.
2011/0307309 A1 12/2011 Forster et al.
2012/0019358 A1 1/2012 Azevedo et al.
2012/0038461 A1 2/2012 Forster
2012/0050011 A1 3/2012 Forster
2012/0061473 A1 3/2012 Forster et al.
2012/0118975 A1 5/2012 Forster
2012/0154121 A1 6/2012 Azevedo et al.
2012/0164405 A1 6/2012 Webb et al.
2012/0173440 A1 7/2012 Dehlinger et al.
2012/0175621 A1 7/2012 Backlund et al.
2012/0182147 A1 7/2012 Forster
2012/0234921 A1 9/2012 Tiedmann et al.
2012/0235870 A1 9/2012 Forster
2012/0261477 A1 10/2012 Elizondo et al.
2012/0274448 A1 11/2012 Marcus et al.
2012/0279100 A1 11/2012 Burout et al.
2012/0290440 A1 11/2012 Hoffman et al.
2012/0292399 A1 11/2012 Launiainen
2013/0059534 A1 3/2013 Sobalvarro et al.
2013/0075481 A1 3/2013 Raymond et al.
2013/0082113 A1 4/2013 Cooper
2013/0092742 A1* 4/2013 Brun ...................... H01L 25/50
235/492
2013/0105586 A1 5/2013 Sykköet al.
2013/0107042 A1 5/2013 Forster
2013/0113627 A1 5/2013 Tiedmann
2013/0135080 A1 5/2013 Mrtanen
2013/0135104 A1 5/2013 Nikkanen
2013/0141222 A1 6/2013 Garcia
2013/0161382 A1 6/2013 Bauer et al.
2013/0163640 A1 6/2013 Aiouaz et al.
2013/0206846 A1 8/2013 Wilkinson
2013/0265139 A1 10/2013 Nummila et al.
2013/0277432 A1 10/2013 Katworapattra et al.
2013/0285795 A1 10/2013 Virtanen et al.
2013/0291375 A1 11/2013 Virtanen et al.
2014/0070010 A1 3/2014 Diorio et al.
2014/0070923 A1 3/2014 Forster et al.
2014/0070957 A1* 3/2014 Longinotti-Buitoni ...................... A61B 5/02055
340/870.01
2014/0073071 A1 3/2014 Diorio et al.
2014/0077954 A1 3/2014 Luo et al.
2014/0084460 A1 3/2014 Nieland et al.
2014/0085089 A1 3/2014 Rasband et al.
2014/0103119 A1 4/2014 Elizondo et al.
2014/0111314 A1 4/2014 Rietzler
2014/0144992 A1 5/2014 Diorio et al.
2014/0158777 A1 6/2014 Gladstone
2014/0191043 A1 7/2014 Forster
2014/0207670 A1 7/2014 Matotek et al.
2014/0209694 A1 7/2014 Forster
2014/0263655 A1 9/2014 Forster
2014/0263659 A1 9/2014 Kervinen et al.
2014/0266633 A1 9/2014 Marcus
2014/0317909 A1 10/2014 Virtanen
2015/0022323 A1 1/2015 Kruest et al.
2015/0024523 A1 1/2015 Virtanen
2015/0032569 A1 1/2015 Stromberg
2015/0048170 A1 2/2015 Forster
2015/0076238 A1 3/2015 Koskelainen
2015/0107092 A1 4/2015 Bashan et al.
2015/0115038 A1 4/2015 Kuschewski et al.
2015/0154488 A1 6/2015 Heo et al.
2015/0181696 A1 6/2015 Elizondo et al.
2015/0227832 A1 8/2015 Diorio et al.
2015/0235062 A1 8/2015 Greefkes
2015/0248604 A1 9/2015 Diorio et al.
2015/0262053 A1 9/2015 Buehler
2015/0269474 A1 9/2015 Finn et al.
2015/0287299 A1 10/2015 Eckert et al.
2015/0328871 A1 11/2015 de Castro
2015/0351689 A1 12/2015 Adams et al.
2015/0353292 A1 12/2015 Roth
2015/0356395 A1 12/2015 Haring et al.
2016/0000374 A1 1/2016 Dandekar et al.
2016/0006115 A1 1/2016 Etzkorn
2016/0019452 A1 1/2016 Forster
2016/0027022 A1 1/2016 Benoit et al.
2016/0034728 A1 2/2016 Oliver et al.
2016/0042206 A1 2/2016 Pesavento
2016/0137396 A1 5/2016 Brownfield
2016/0154618 A1 6/2016 Duckett
2016/0157348 A1 6/2016 Elizondo et al.
2016/0162776 A1 6/2016 Kruest et al.
2016/0172742 A1 6/2016 Forster
2016/0172743 A1 6/2016 Forster
2016/0189020 A1 6/2016 Duckett et al.
2016/0203395 A1 7/2016 Huhtasalo
2016/0210547 A1 7/2016 Dekeyser et al.
2016/0214422 A1 7/2016 Deyoung et al.
2016/0233188 A1 8/2016 Kriebel et al.
2016/0253732 A1 9/2016 Brown
2016/0316317 A1 10/2016 Mayiras
2016/0321479 A1 11/2016 Uhl et al.
2016/0336198 A1 11/2016 Singleton et al.
2016/0342821 A1 11/2016 Nyalamadugu et al.
2016/0342883 A1 11/2016 Huhtasalo
2016/0364589 A1 12/2016 Roth
2016/0365644 A1 12/2016 Finn et al.
2017/0011664 A1 1/2017 Forster et al.
2017/0068882 A1 3/2017 Elizondo et al.
2017/0091498 A1 3/2017 Forster et al.
2017/0098393 A1 4/2017 Duckett et al.
2017/0124363 A1 5/2017 Rietzler
2017/0161601 A1 6/2017 Sevaux
2017/0169263 A1 6/2017 Kohler et al.
2017/0196513 A1 7/2017 Longinotti-Buitoni et al.
2017/0235982 A1 8/2017 Kruest et al.
2017/0243032 A1 8/2017 Pesavento et al.
2017/0286819 A9 10/2017 Huhtasalo
2017/0305068 A1 10/2017 Caldwell et al.
2017/0364716 A1 12/2017 Huhtasalo et al.
2018/0025601 A1 1/2018 Gao et al.
2018/0032774 A1 2/2018 Kruest et al.
2018/0096176 A1 4/2018 Greefkes
2018/0101759 A1 4/2018 Forster
2018/0121690 A1 5/2018 Forster et al.
2018/0123220 A1 5/2018 Forster
2018/0137314 A1 5/2018 Roth
2018/0157873 A1 6/2018 Roth

(56) References Cited

U.S. PATENT DOCUMENTS

| | | | |
|---|---|---|---|
| 2018/0157874 | A1 | 6/2018 | Huhtasalo et al. |
| 2018/0157879 | A1 | 6/2018 | Forster |
| 2018/0165485 | A1 | 6/2018 | Martinez De Velasco Cortina et al. |
| 2018/0255636 | A1 | 9/2018 | Seo |
| 2018/0268175 | A1 | 9/2018 | Rietzler |
| 2018/0310644 | A1* | 11/2018 | Poupyrev ............. A61B 5/6897 |
| 2018/0310659 | A1* | 11/2018 | Poupyrev ............... A61B 5/291 |
| 2018/0336383 | A1 | 11/2018 | Roth |
| 2019/0026616 | A1 | 1/2019 | Bourque et al. |
| 2019/0057289 | A1 | 2/2019 | Bauer et al. |
| 2019/0087705 | A1 | 3/2019 | Bourque et al. |
| 2019/0132948 | A1* | 5/2019 | Longinotti-Buitoni ...................... A61B 5/743 |
| 2019/0147773 | A1 | 5/2019 | Cockerell |
| 2019/0205724 | A1 | 7/2019 | Roth |
| 2019/0220724 | A1 | 7/2019 | Huhtasalo |
| 2019/0228280 | A1 | 7/2019 | Zanesi |
| 2019/0244072 | A1 | 8/2019 | Forster |
| 2019/0251411 | A1 | 8/2019 | Gire et al. |
| 2019/0266464 | A1 | 8/2019 | Forster |
| 2019/0297960 | A1 | 10/2019 | Jur et al. |
| 2019/0389613 | A1 | 12/2019 | Colarossi |
| 2019/0391560 | A1 | 12/2019 | Arene et al. |
| 2020/0006840 | A1 | 1/2020 | Forster |
| 2020/0051463 | A1 | 2/2020 | Melo |
| 2020/0126454 | A1 | 4/2020 | Sevaux |
| 2020/0134408 | A1 | 4/2020 | Law |
| 2020/0151401 | A1 | 5/2020 | Dyche et al. |
| 2020/0160142 | A1 | 5/2020 | Roth |
| 2020/0193260 | A1 | 6/2020 | Forster |
| 2020/0193261 | A1 | 6/2020 | de Backer |
| 2020/0193455 | A1 | 6/2020 | Hoffman et al. |
| 2020/0202294 | A1 | 6/2020 | Duckett et al. |
| 2020/0207116 | A1 | 7/2020 | Raphael et al. |
| 2020/0249109 | A1 | 8/2020 | Singleton et al. |
| 2020/0265446 | A1 | 8/2020 | Vargas |
| 2020/0297063 | A1* | 9/2020 | Andon ................... G08G 1/005 |
| 2020/0335475 | A1 | 10/2020 | Rolland et al. |
| 2020/0381829 | A1 | 12/2020 | Andia Vera et al. |
| 2020/0394697 | A1 | 12/2020 | Paolella et al. |
| 2021/0215562 | A1 | 7/2021 | Boellaard et al. |
| 2021/0241063 | A1 | 8/2021 | Thirappa et al. |
| 2021/0312471 | A1 | 10/2021 | Iyer |
| 2022/0012439 | A1 | 1/2022 | Duckett et al. |
| 2022/0171951 | A1 | 6/2022 | Vargas et al. |
| 2022/0180014 | A1 | 6/2022 | Barr et al. |
| 2022/0196500 | A1 | 6/2022 | Singleton et al. |
| 2022/0215353 | A1 | 7/2022 | Duckett |
| 2022/0230134 | A1 | 7/2022 | Pursell et al. |
| 2022/0269919 | A1 | 8/2022 | de Backer |
| 2022/0277152 | A1 | 9/2022 | Forster |
| 2022/0284253 | A1 | 9/2022 | Garcia et al. |
| 2022/0318532 | A1 | 10/2022 | Roth |
| 2022/0358337 | A1 | 11/2022 | Diorio et al. |
| 2022/0358339 | A1 | 11/2022 | Forster et al. |
| 2022/0358340 | A1 | 11/2022 | Sowle et al. |
| 2022/0391654 | A1 | 12/2022 | Forster |
| 2022/0398424 | A1 | 12/2022 | Forster |
| 2022/0398425 | A1 | 12/2022 | Roth |
| 2022/0414356 | A1 | 12/2022 | Roth |
| 2022/0414411 | A1 | 12/2022 | Forster |

FOREIGN PATENT DOCUMENTS

| | | | |
|---|---|---|---|
| CN | 101523605 | A | 9/2009 |
| CN | 101711430 | A | 5/2010 |
| CN | 103080392 | A | 5/2013 |
| CN | 104781857 | A | 7/2015 |
| CN | 206258897 | U | 6/2017 |
| CN | 110326100 | A | 10/2019 |
| CN | 110945716 | A | 3/2020 |
| DE | 102006051379 | A1 | 4/2008 |
| DE | 102007001411 | A1 | 7/2008 |
| DE | 202013100682 | U1 | 4/2013 |
| EA | 1826711 | A1 | 8/2007 |
| EP | 1630728 | A1 | 3/2006 |
| EP | 1739597 | A2 | 1/2007 |
| EP | 2057687 | A1 | 5/2009 |
| EP | 2158604 | A2 | 3/2010 |
| EP | 2585628 | A1 | 5/2013 |
| EP | 2897084 | A1 | 7/2015 |
| EP | 2504796 | B1 | 9/2015 |
| EP | 3319168 | A1 | 5/2018 |
| EP | 3574521 | A1 | 12/2019 |
| EP | 3662534 | A1 | 6/2020 |
| EP | 3923195 | A1 | 12/2021 |
| FR | 2905518 | A1 | 3/2008 |
| FR | 2917895 | A1 | 12/2008 |
| FR | 2961947 | A1 | 12/2011 |
| FR | 3058579 | A1 | 5/2018 |
| FR | 3062515 | A1 | 8/2018 |
| FR | 3069962 | A1 | 2/2019 |
| FR | 3078980 | A1 | 9/2019 |
| FR | 3103043 | A1 | 5/2021 |
| FR | 3103044 | A1 | 5/2021 |
| FR | 3103630 | A1 | 5/2021 |
| JP | 2004118625 | A | 4/2004 |
| JP | 2010502030 | A | 1/2010 |
| JP | 2010530630 | A | 9/2010 |
| JP | 5059110 | B2 | 10/2012 |
| JP | 2013529807 | A | 7/2013 |
| JP | 5405457 | B2 | 2/2014 |
| JP | 5815692 | B2 | 11/2015 |
| JP | 2020505714 | A | 2/2020 |
| WO | 2002045011 | A1 | 6/2002 |
| WO | 2007104634 | A1 | 9/2007 |
| WO | 2008025889 | A1 | 3/2008 |
| WO | 2009004243 | A2 | 1/2009 |
| WO | 2011160606 | A1 | 12/2011 |
| WO | 2011161336 | A1 | 12/2011 |
| WO | 2018138437 | A1 | 8/2018 |
| WO | 2019025683 | A1 | 2/2019 |
| WO | 2019175509 | A1 | 9/2019 |

OTHER PUBLICATIONS

Extended European Search Report for European Patent Application No. 20 196 210.7, mailed Feb. 5, 2021 (21 pages).

International Search Report and Written Opinion For International Patent Application No. PCT/US2020/051625, mailed Dec. 21, 2020.

International Search Report and Written Opinion issued for PCT/IB2018/053626 dated Feb. 4, 2019.

Office Action in EP20786356.4, mailed Jul. 12, 2023, 7 pages.

* cited by examiner

600

SECURITY TAG FOR TEXTILES USING CONDUCTIVE THREAD

CROSS-REFERENCE TO RELATED APPLICATIONS

This application claims the benefit of U.S. Provisional Application No. 62/901,215, entitled "Security Tag for Textiles Using Conductive Thread," filed Sep. 16, 2019, which is expressly incorporated by reference herein in its entirety.

BACKGROUND

Technical Field

The present disclosure relates generally to Electronic Article Surveillance (EAS). Examples related to EAS using a Radio Frequency Identification (RFID) tag integrated into a fabric or textile.

Introduction

EAS systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected are tagged with an EAS marker that, when active, generates a response signal when passed through this interrogation zone. An antenna and receiver in the same or another "pedestal" detects this response signal and generates an alarm.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Examples of the technology disclosed herein include methods, systems, and tags of electronic article surveillance (EAS). In some examples, an EAS-enabled item includes a textile element and an EAS element. The EAS element includes an antenna subsystem and EAS electronic. The antenna subsystem is integrated into the textile element, where "integrated" connotes a manner of incorporation that would require damage to the item to remove by typical methods. The EAS electronics are in conductive communication with the antenna subsystem.

In some examples, the antenna subsystem includes two antenna elements extending from the EAS electronics in substantially opposite directions along a diametric line through the EAS electronics. In such examples, each antenna element is integrated into the textile element by one of weaving, knitting, crocheting, knotting, tatting, felting, or braiding. In some such examples, one of the two antenna elements is offset from the diametric line.

In some examples, the EAS element includes a radio frequency identification (RFID) element. In some examples, the EAS element includes at least one sensor from among a physiological sensor, a motion sensor, and a location sensor. In some examples, the EAS element includes an energy harvesting subsystem.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents

DETAILED DESCRIPTION

Figure 1:
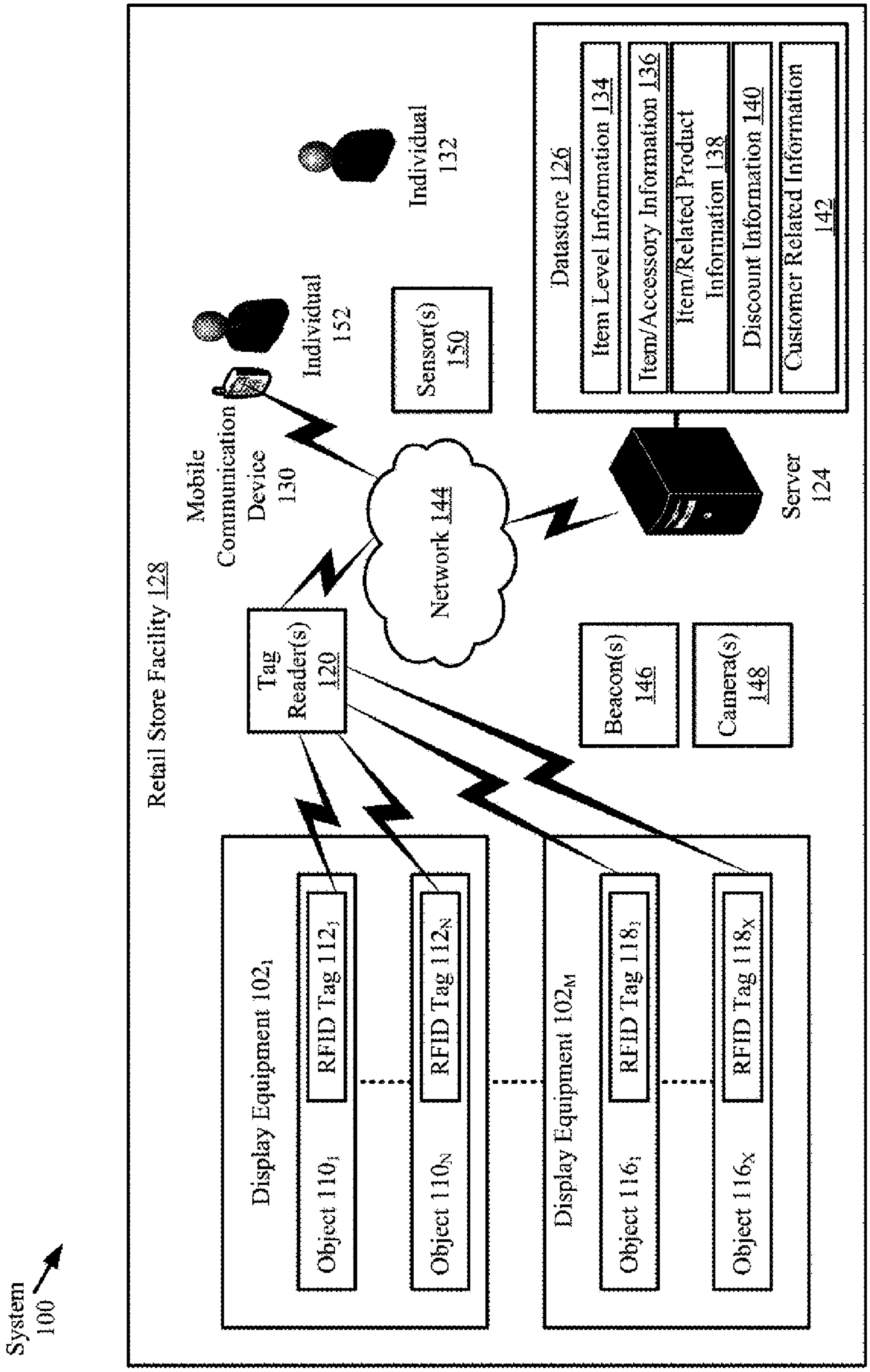
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution therefore is indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages, and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

As used in this document, the singular form "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Items intended for sale to the consumer may be tagged with RFID elements that enable tracking of the items from their point of origin, through the supply chain, and then through a retail store to the point of final sale to the end consumer. It is contemplated that RFID elements that may be attached to items can continue to be useful to the consumer long after the item has been purchased. RFID data embedded in an items can be utilized in, for example, household systems that may be useful to the consumer for tracking and inventorying their personal belongings, monitoring the health of the item end user, and reporting on the environment of the item end user. For these types of permanently-attached/integrated tags, it may also be advantageous to provide additional sensors and electronics in the tag that can capture environmental data. It is also desirable that the electronics be waterproof, durable, and mechanically robust.

One drawback of associating conventional RFID tags and other sensor devices for purposes of theft prevention is that the existence of the tag itself is often visible to thieves. Shoplifters in many cases are able to locate the conventional RFID tag and simply remove, disable, or shield the conventional RFID tag to make evade detection by exit portal RFID readers.

Examples of the technology disclosed herein include methods, systems, and tags of electronic article surveillance (EAS). In some examples, an EAS-enabled item includes a textile element and an EAS element. The EAS element includes an antenna subsystem and EAS electronic. The antenna subsystem is integrated into the textile element, where "integrated" connotes a manner of incorporation that would require damage to the item to remove by typical methods. The EAS electronics are in conductive communication with the antenna subsystem.

In some examples, the antenna subsystem includes two antenna elements extending from the EAS electronics in substantially opposite directions along a diametric line through the EAS electronics. In such examples, each antenna element is integrated into the textile element by one of weaving, knitting, crocheting, knotting, tatting, felting, or braiding. In some such examples, one of the two antenna elements is offset from the diametric line.

In some examples, the EAS element includes a radio frequency identification (RFID) element. In some examples, the EAS element includes at least one sensor from among a physiological sensor, a motion sensor, and a location sensor. In some examples, the EAS element includes an energy harvesting subsystem.

These and other features of the present disclosure are discussed in detail below with regard to FIGS. 1-8.

Referring now to FIG. 1, there is provided a schematic illustration of an illustrative system 100 that is useful for understanding the present solution. The present solution is described herein in relation to a retail store environment. The present solution is not limited in this regard and can be used in other environments. For example, the present solution can be used in distribution centers, factories and other commercial environments. Notably, the present solution can be employed in any environment in which objects and/or items need to be located and/or tracked.

The system 100 is generally configured to allow (a) improved inventory counts and surveillance of objects and/or items located within a facility, and (b) improved customer experiences. As shown in FIG. 1, system 100 comprises a Retail Store Facility ("RSF") 128 in which display equipment $\mathbf{102}_1$-$\mathbf{102}_M$ is disposed. The display equipment is provided for displaying objects (or items) $\mathbf{110}_1$-$\mathbf{110}_N$, $\mathbf{116}_1$-$\mathbf{116}_X$ to customers of the retail store. The display equipment can include, but is not limited to, shelves, article display cabinets, promotional displays, fixtures, and/or equipment se-curing areas of the RSF 128. The RSF can also include emergency equipment (not shown), checkout counters, video cameras, people counters, and conventional EAS systems are well known in the art, and therefore will not be described herein.

At least one tag reader 120 is provided to assist in counting and tracking locations the objects $\mathbf{110}_1$-$\mathbf{110}_N$, $\mathbf{116}_1$-$\mathbf{116}_X$ within the RSF 128. The tag reader 120 comprises an RFID reader configured to read RFID tags. RFID readers are well known in the art, and therefore will be described at a sufficient level of detail below for understanding of the claimed invention.

RFID tags $\mathbf{112}_1$-$\mathbf{112}_N$, $\mathbf{118}_1$-$\mathbf{118}_X$ are respectively attached or coupled to the objects $\mathbf{110}_1$-$\mathbf{110}_N$, $\mathbf{116}_1$-$\mathbf{116}_X$. This coupling is achieved via an adhesive (e.g., glue, tape, or sticker), a mechanical coupler (e.g., straps, clamps, snaps, etc.), a weld, chemical bond, or other means. The RFID tags can alternatively or additionally comprise dual-technology tags that have both EAS and RFID capabilities as described herein. In examples of the technology disclosed herein, the elements of an RFID tag are integrated into a textile component of an item, for example to the fabric/cloth of an item of clothing, into a fabric portion of a handbag, into a rip stop portion of a backpack, etc.

Notably, the tag reader 120 is strategically placed at a known location within the RSF 128, for example, at an exit/entrance. By correlating the tag reader's RFID tag reads and the tag reader's known location within the RSF 128, it is possible to determine the general location of objects $\mathbf{110}_1$, . . . , $\mathbf{110}_N$, $\mathbf{116}_1$, . . . , $\mathbf{116}_X$ within the RSF 128. The tag reader's known coverage area also facilitates object location determinations. Accordingly, RFID tag read information and tag reader location information is stored in a datastore 126. This information can be stored in the datastore 126 using a server 124 and network 144 (e.g., an Intranet and/or Internet).

System 100 also comprises a Mobile Communication Device ("MCD") 130. MCD 130 includes, but is not limited to, a cell phone, a smart phone, a table computer, a personal digital assistant, and/or a wearable device (e.g., a smart watch). Each of the listed devices is well known in the art, and therefore will not be described herein. In accordance with some examples, the MCD 130 has a software application installed thereon that is operative to: facilitate the provision of various information 134-142 to the individual 152; facilitate a purchase transaction; and/or facilitate the detachment of the RFID tags $\mathbf{112}_1$-$\mathbf{112}_N$, $\mathbf{118}_1$-$\mathbf{118}_X$ from the objects $\mathbf{110}_1$-$\mathbf{110}_N$, $\mathbf{116}_1$-$\mathbf{116}_X$; and/or facilitate the detachment of an anchored chain or cable from the objects $\mathbf{110}_1$-$\mathbf{110}_N$, $\mathbf{116}_1$-$\mathbf{116}_X$.

The MCD 130 is generally configured to provide a visual and/or auditory output of item level information 134, accessory information 136, related product information 138, discount information 140, and/or customer related information 142. The item level information includes, but is not limited to, an item description, item nutritional information, a promotional message, an item regular price, an item sale price, a currency symbol, and/or a source of the item.

An accessory includes, but is not limited to, a useful auxiliary item that can be attached to or removed from an item (e.g., a drill bit or battery of a drill). The accessory information includes, but is not limited to, an accessory description, accessory nutritional information, a promotional message, an accessory regular price, an accessory sale price, a currency symbol, a source of the accessory, and/or an accessory location in the facility.

A related product includes, but is not limited to, a product that can be used in conjunction with or as an alternative to another product (e.g., diaper rash cream which can be used when changing a diaper, or a first diaper can be used as an alternative to another diaper). The related product information includes, but is not limited to, a related product description, related product nutritional information, a promotional message, a related product regular price, a related product sale price, a currency symbol, a source of the related product, and/or a related product location in the facility.

The discount information can include, but is not limited to, a discount price for a product based on a loyalty level or other criteria. The customer related information includes, but is not limited to, customer account numbers, customer identifiers, usernames, passwords, payment information, loyalty levels, historical purchase information, and/or activity trends.

The item level information, accessory information, related product information and/or discount in-formation can be output in a format selected from a plurality of formats based on a geographic location of the item, a location of the MCD, a date, and/or an item pricing status (i.e., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selected parameter.

The MCD 130 can also be configured to read barcodes and/or RFID tags. Information obtained from the barcode and/or RFID tag reads may be communicated from the MCD 130 to the server 124 via network 144. Similarly, the stored information 134-142 is provided from the server 124 to the MCD 130 via network 144. The network 144 includes an Intranet and/or the Internet.

Server 124 can be local to the facility 128 as shown in FIG. 1 or remote from the facility 128. Server 124 will be described in more detail below in relation to FIG. 4. Still, it should be understood that server 124 is configured to: write data to and read data from datastore 126, RFID tags $\mathbf{112}_1$-$\mathbf{112}_N$, $\mathbf{118}_1$-$\mathbf{118}_X$, and/or MCD 130; perform language and currency conversion operations using item level information and/or accessory information obtained from the datastore, RFID tags, and/or MCD; perform data analytics based on inventory information, tag read information, MCD tacking information, and/or information 134-142; perform image processing using images captured by camera(s) 148; and/or determine locations of RFID tags and/or MCDs in the RSF 128 using beacon(s) 146, tag reader 120 or other devices having known locations and/or antenna patterns.

In some examples, one or more beacons 146 transmitting an RF signal (second RF signal that is non-RFID) other than the RFID interrogation signal are placed to cover a zone of interest also covered by a tag reader 120 placed to cover an RFID interrogation zone, e.g., at a portal of the retail facility 128. The system 100 can detect and derive any number of relevant indicators based on second RF signal. The tag 112/118 response to the second RF signal is analyzed and compared to data collected by the RFID signal response that occurred concurrently with the tag's passage through the portal.

The server 124 facilitates updates to the information 134-142 output from the MCD 130. Such information updating can be performed periodically, in response to instructions received from an associate (e.g., a retail store employee 132), in response to a detected change in the item level, accessory and/or related product information, in response to a detection that an individual is in proximity to an RFID tag, and/or in response to any motion or movement of the RFID tag. For example, if a certain product is placed on sale, then the sale price for that product is transmitted to MCD 130 via network 144 and/or RFID tag. The sale price is then output from the MCD 130. The present solution is not limited to the particulars of this example.

Although a single MCD 130 and/or a single server 124 is (are) shown in FIG. 1, the present solution is not limited in this regard. It is contemplated that more than one computing device can be implemented. In addition, the present solution is not limited to the illustrative system architecture described in relation to FIG. 1.

During operation of system 100, the content displayed on the display screen of the MCD 130 is dynamically controlled based upon various tag or item related information and/or customer related information (e.g., mobile device identifier, mobile device location in RSF 128, and/or customer loyalty level). Tag or item level information includes, but is not limited to, first information indicating that an RFID tag is in motion or that an object is being handled by an individual 152, second information indicating a current location of the RFID tag and/or the MCD 130, third information indicating an accessory or related product of the object to which the moving RFID tag is coupled, and/or fourth information indicating the relative locations of the accessory and the moving RFID tag and/or the relative locations of the related product and the moving RFID tag. The first, second and fourth information can be derived based on sensor data generated by sensors local to the RFID tag. Accordingly, the RFID tags $\mathbf{112}_1$-$\mathbf{112}_N$, $\mathbf{118}_1$-$\mathbf{118}_X$ include one or more sensors to detect their current locations, detect any individual in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communication device. The third information can be stored local to the RFID tag(s) or in a remote datastore 126 as information 136, 138.

In some scenarios, the MCD 130 facilitates the server's 124 (a) detection of when the individual 152 enters the RSF 128, (b) tracking of the individual's movement through the RSF, (c) detection of when the individual is in proximity to an object to which an RFID tag is coupled, (d) determination that an RFID tag is being handled or moved by the individual based on a time stamped pattern of MCD movement and a timestamped pattern of RFID tag movement, and/or (e) determination of an association of moving RFID tags and the individual.

When a detection is made that an RFID tag is being moved, the server 124 can, in some scenarios, obtain customer related information (such as a loyalty level) 142 associated with the individual 152. This information can be obtained from the individual's MCD 130 and/or the datastore 126. The customer related information 142 is then used to retrieve discount information 140 for the object to which the RFID tag is coupled. The retrieved discount information is then communicated from the server 124 to the individual's MCD 130. The individual's MCD 130 can output the discount information in a visual format and/or an auditory format. Other information may also be communicated from the server 124 to the individual's MCD 130. The other information includes, but is not limited to, item level information, accessory information, and/or related product information.

In those or other scenarios, a sensor embedded in the RFID tag detects when an individual is handling the object to which the RFID tag is coupled. When such a detection is made, the RFID tag retrieves the object's unique identifier from its local memory, and wirelessly communicates the same to the tag reader 120. The tag reader 120 then passes the information to the server 124. The server 124 uses the object's unique identifier and the item/accessory relationship in-formation (e.g., table) 136 to determine if there are any accessories associated therewith. If no accessories exist for the object, the server 124 uses the item level information 134 to determine one or more characteristics of the object. For example, the object includes a product of a specific brand. The server 124 then uses the item/related product information (e.g., table) 138 to identify: other products of the same type with the same characteristics; and/or other products that are typically used in conjunction with the object. Related product information for the identified related products is then retrieved and provided to the MCD 130. The MCD 130 can output the related product information in a visual format and/or an auditory format. The individual 152 can perform user-software interactions with the MCD 130 to obtain further information obtain the related product of interest. The present solution is not limited to the particulars of this scenario.

Figure 2:
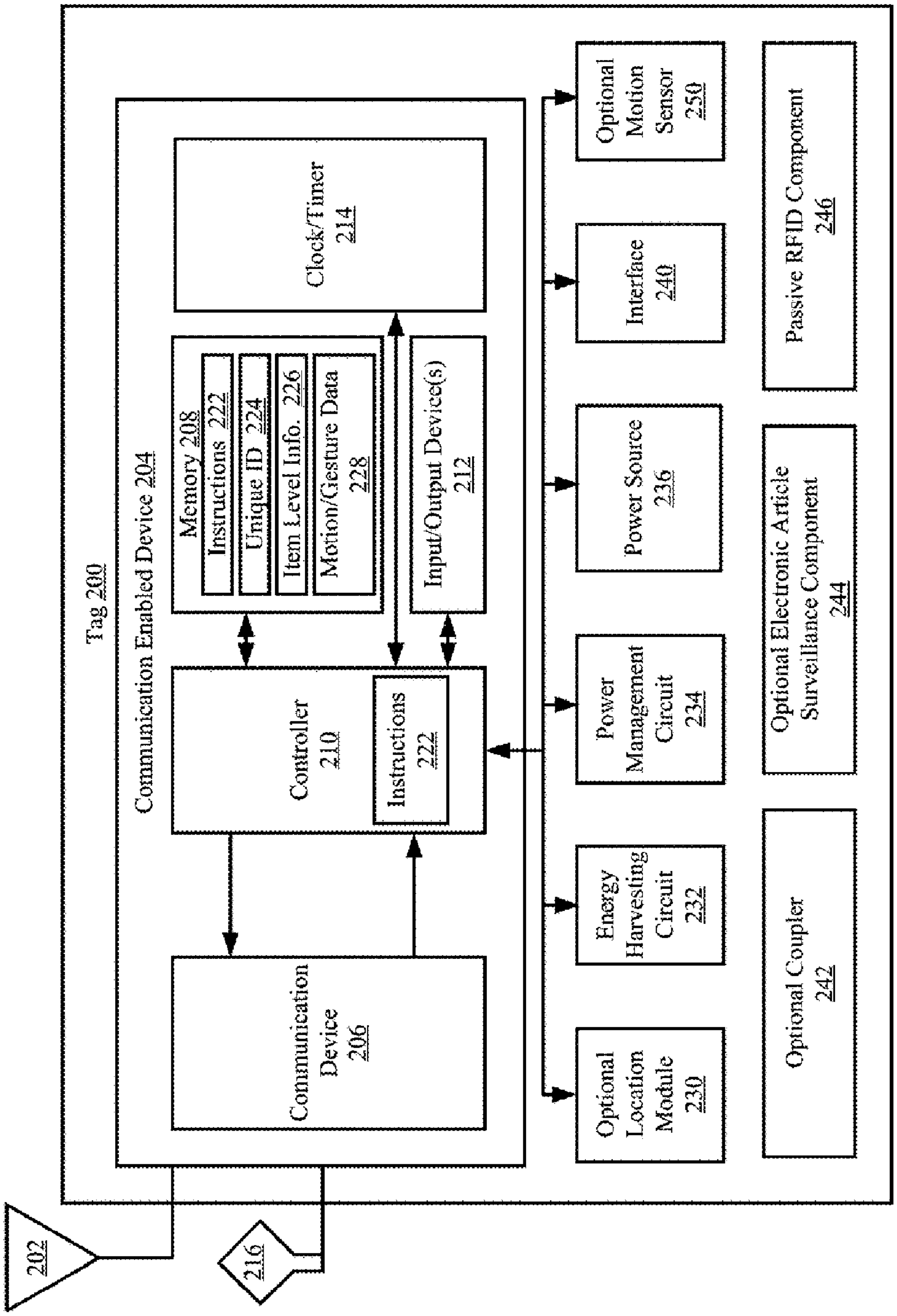
FIG. 2 is an illustration of an illustrative architecture for a tag.

Referring now to FIG. 2, there is an illustration of an illustrative architecture for a tag 200. RFID tags $\mathbf{112_1}$-$\mathbf{112_N}$, $\mathbf{118_1}$-$\mathbf{118_X}$ are the same as or similar to tag 200. As such, the discussion of tag 200 is sufficient for understanding the RFID tags $\mathbf{112_1}$-$\mathbf{112_N}$, $\mathbf{118_1}$-$\mathbf{118_X}$ of FIG. 1. Tag 200 is generally configured to perform operations to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management/surveillance and customer experience. In this regard, the tag 200 is configured for allowing data to be exchanged with an external device (e.g., tag reader 120 of FIG. 1, a beacon 146 of FIG. 1, a Mobile Communication Device ("MCD") 130 of FIG. 1, and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is) are employed: Radio Frequency ("RF") communication technology; Bluetooth technology (including Bluetooth Low Energy (LE)); WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204 and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM"), and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol later, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology, a SRC technology, and/or a beacon technology). The antenna 202, 216 is configured to receive signals from the external de-vice and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or 112 of FIG. 1) to which the tag 200 is coupled.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when motion is detected by the motion sensor 250. The WOT can be determined based on environmental conditions (e.g., humidity, temperature, time of day, relative distance to a location device (e.g., beacon or location tag), etc.) and/or system conditions (e.g., amount of traffic, interference occurrences, etc.). In this regard, the tag 200 can include additional sensors not shown in FIG. 2.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 can be stored in memory 208 of the communication enabled device 204 and/or communicated to other external devices (e.g., tag reader 120 of FIG. 1, beacon 146 of FIG. 1, MCD 130 of FIG. 1, and/or server 124 of FIG. 1) via communication device (e.g., transceiver) 206 and/or interface 240 (e.g., an Internet Protocol or cellular network interface). For example, the communication enabled de-vice 204 can communicate information specifying a timestamp, a unique identifier for an item, item description, item price, a currency symbol and/or location information to an external device. The external device (e.g., server or MCD) can then store the information in a database (e.g., database 126 of FIG. 1) and/or use the information for various purposes.

The communication enabled device 204 also comprises a controller 210 (e.g., a CPU) and in-put/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, with-in the controller 210 during execution thereof by the tag 200. The memory 208 and the controller 210 also can constitute machine-readable media. The term "machine-readable media," as used here, refers to a single medium or multiple media (e.g., a centralized or distributed database, and/or associated caches and servers) that store the one or more sets of instructions 222. The term "machine-readable media," as used here, also refers to any medium that is capable of storing, encoding, or carrying a set of instructions 222 for execution by the tag 200 and that cause the tag 200 to perform any one or more of the methodologies of the present disclosure.

The input/output devices can include, but are not limited to, a display (e.g., an E Ink display, an LCD display and/or an active matrix display), a speaker, a keypad, and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic lo-cation can be used herein without limitation including relative positioning within a facility or structure.

The optional coupler 242 is provided to couple (securely or removably, but not typically permanently) the tag 200 to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional Electronic Article Surveillance ("EAS") component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

As noted above, the tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communications operation. For example, the sensor data can be compared to stored motion/gesture data 228 to determine if a match exists there-between. More specifically, a motion/gesture pattern specified by the sensor data can be compared to a plurality of motion/gesture patterns specified by the stored motion/gesture data 228. The plurality of motion/gesture patterns can include, but are not limited to, a motion pattern for walking, a motion pattern for running, a motion pattern for vehicle transport, a motion pattern for vibration caused by equipment or machinery in proximity to the tag (e.g., an air conditioner or fan), a gesture for requesting assistance, a gesture for obtaining additional product information, and/or a gesture for product purchase. The type of movement (e.g., vibration or being carried) is then determined based on which stored motion/gesture data matches the sensor data. This feature of the present solution allows the tag 200 to selectively enable the communication device (e.g., transceiver) or at least one communications operation only when the tag's location within a facility is actually being changed (e.g., and not when a fan is causing the tag to simply vibrate).

In some scenarios, the tag 200 can be also configured to enter a sleep state in which at least the motion sensor triggering of communication operations is disabled. This is desirable, for example, in scenarios when the tag 200 is being shipped or transported from a distributor to a customer. In those or other scenarios, the tag 200 can be further configured to enter the sleep state in response to its continuous detection of motion for a given period of time. The tag can be transitioned from its sleep state in response to expiration of a defined time period, the tag's reception of a control signal from an external device, and/or the tag's detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee 132 of FIG. 1) so that (s) he can investigate why the tag 200 is not recharging and/or holding charge.

The power management circuit 234 is also capable of redirecting an energy source to the tag's 200 electronics based on the energy source's status. For example, if harvested energy is sufficient to run the tag's 200 function, the power management circuit 234 confirms that all of the tag's 200 storage sources are fully charged such that the tag's 200 electronic components can be run directly from the harvested energy. This ensures that the tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee 132 of FIG. 1) so that (s) he can investigate the issue. It may be that other merchandise are obscuring the harvesting source or the item is being stolen.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) by-pass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the tag 200. Additionally or alternatively, a switch can be actuated for creating a closed or open circuit. The pre-sent solution is not limited in this regard.

In some examples, tag 200 includes an RFID subsystem, such as communication-enabled device 204 described above, operative to receive an RFID interrogation signal and respond with an RFID response. Such tags 200 include a non-RFID RF subsystem, also incorporated into communication enabled device 204, operative to receive a non-RFID RF signal and respond by wirelessly indicating that the non-RFID subsystem received the non-RFID RF signal. In some such examples, the non-RFID subsystem responds that the non-RFID RF subsystem received the non-RFID RF signal by one of: allowing the RFID subsystem to respond to the RFID interrogation signal with an RFID response only upon the non-RFID RF subsystem having received a non-RFID RF signal concurrently; supplementing the RFID response with at least one information element indicating that the non-RFID RF subsystem received the non-RFID RF signal; and separately transmitting a non-RFID response. In some such examples, the non-RFID RF subsystem is a personal area network (PAN) signal. In some such examples, the PAN is a Bluetooth PAN.

Figure 3:
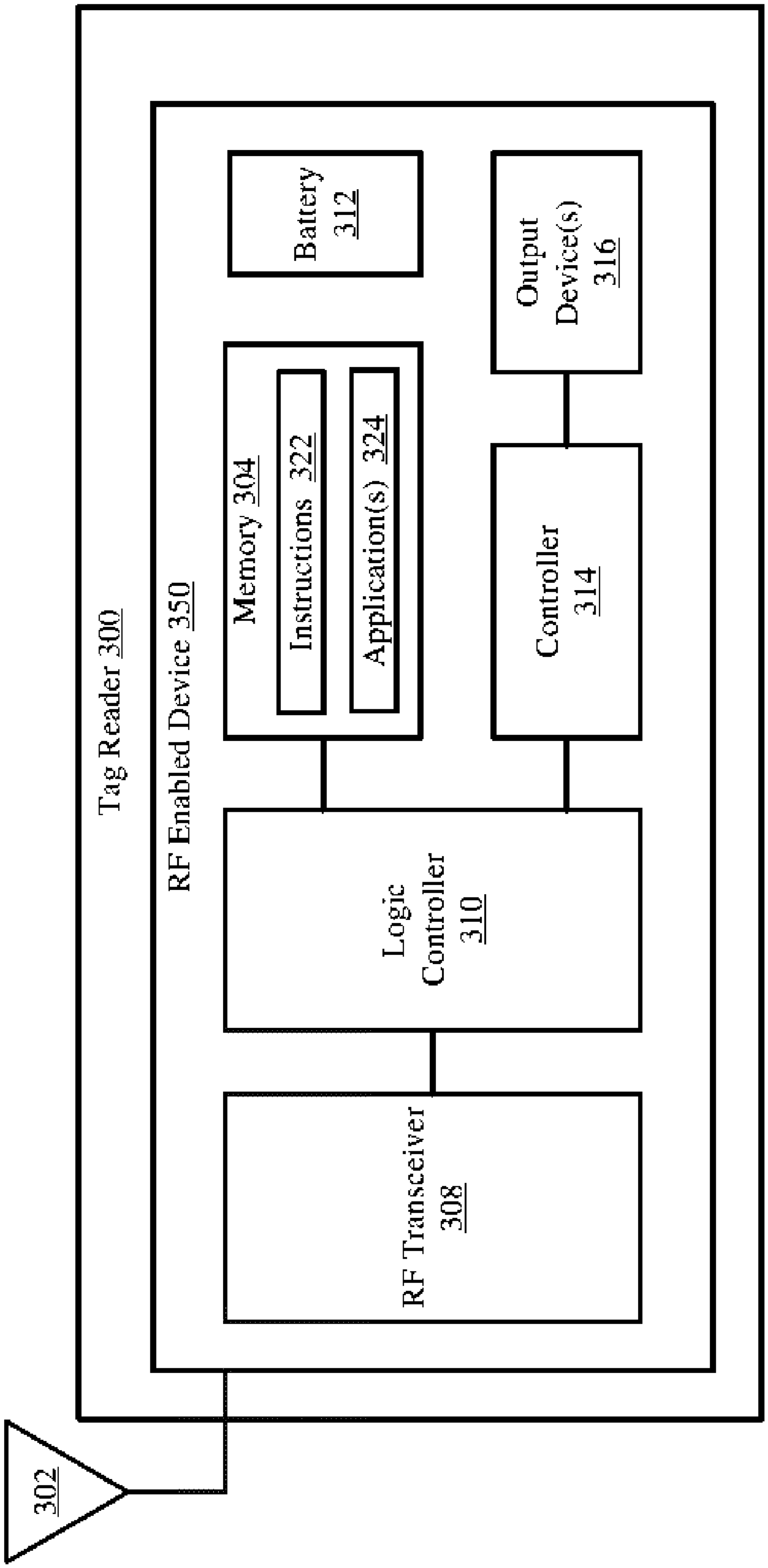
FIG. 3 is an illustration of an illustrative architecture for a tag reader.

Referring now to FIG. 3, there is provided a detailed block diagram of an exemplary architecture for a tag reader 300. Tag reader 120 of FIG. 1 is the same as or similar to tag reader 200. As such, the discussion of tag reader 200 is sufficient for understanding tag reader 120.

Tag reader 300 may include more or less components than that shown in FIG. 3. However, the components shown are sufficient to disclose an illustrative embodiment implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 300 comprises an RF enabled device 350 for allowing data to be exchanged with an external device (e.g., RFID tags $\mathbf{112}_1$-$\mathbf{112}_N$, $\mathbf{118}_1$-$\mathbf{118}_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises an antenna 302 for allowing data to be exchanged with the external device via RF technology (e.g., RFID technology or other RF based technology). The external device may comprise RFID tags $\mathbf{112}_1$-$\mathbf{112}_N$, $\mathbf{118}_1$-$\mathbf{118}_X$ of FIG. 1. In this case, the antenna 302 is configured to transmit RF carrier signals (e.g., interrogation signals) to the listed external devices, and/or transmit data response signals (e.g., authentication reply signals or an RFID response signal) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location, and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and pre-stored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is (are) to be turned on when motion is detected thereby, and communicate the same to the given RFID tag. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory," as used herein, refers to memory configured to store data in a plain text form. The phrase "secure memory," as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags are present within a facility, where the RFID tags are located within a facility, which RFID tags are in motion at any given time, and which RFID tags are also in zone of a second RF signal (e.g., a Bluetooth beacon or NFC or other SRC system). Other functions of the RF enabled device 350 will become apparent as the discussion progresses.

Figure 4:
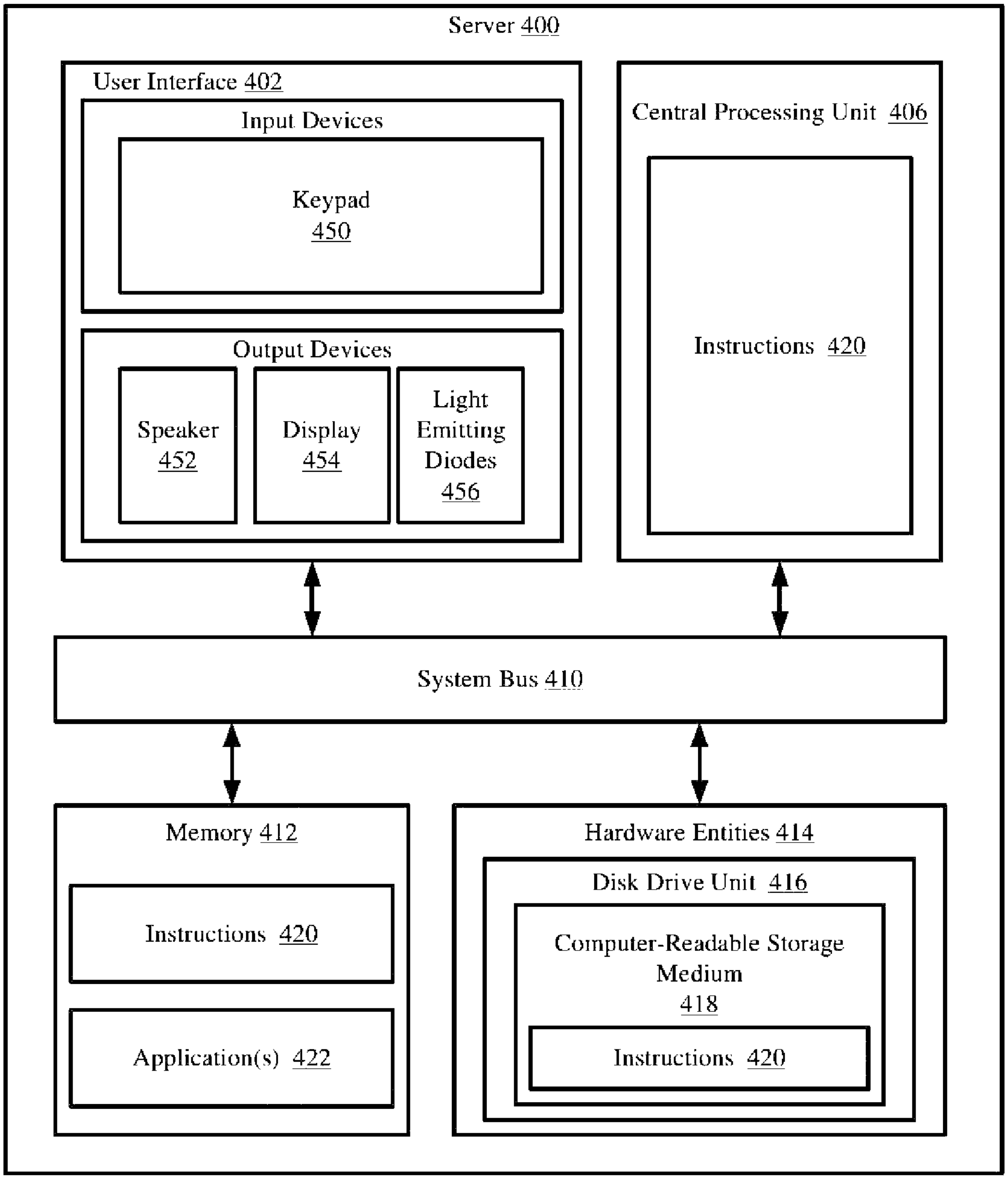
FIG. 4 is an illustration of an illustrative architecture for a server.

Referring now to FIG. 4, there is provided a detailed block diagram of an exemplary architecture for a server 400. Server 124 of FIG. 1 is the same as or substantially similar to server 400. As such, the following discussion of server 400 is sufficient for understanding server 124.

Notably, the server 400 may include more or less components than those shown in FIG. 4. However, the components shown are sufficient to disclose an illustrative embodiment implementing the present solution. The hardware architecture of FIG. 4 represents one embodiment of a representative server configured to facilitate inventory counts, inventory management, and improved customer experiences. As such, the server 400 of FIG. 4 implements at least a portion of some methods for EAS, in which an EAS system 100 determines, based on receiving both at least one RFID response signal from a first RFID tag of the EAS system responding to an RFID interrogation signal and an indication that the first RFID tag received a second non-RFID RF transmission, that the first RFID tag is in a zone of interest.

Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to, and/or programmed to perform one or more of the methodologies, procedures, or functions described herein.

As shown in FIG. 4, the server 400 comprises a user interface 402, a CPU 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a RAM, a disk driver, and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, with-in the memory 412 and/or within the CPU 406 during execution thereof by the server 400. The memory 412 and the CPU 406 also can constitute machine-readable media. The term "machine-readable media," as used here, refers to a single medium or multiple media (e.g., a centralized or distributed database, and/or associated caches and servers) that store the one or more sets of instructions 420. The term “machine-readable media,” as used here, also refers to any medium that is capable of storing, encoding, or carrying a set of instructions 420 for execution by the server 400 and that cause the server 400 to perform any one or more of the methodologies of the present disclosure.

In some scenarios, the hardware entities 414 include an electronic circuit (e.g., a processor) programmed for facilitating the provision of a three-dimensional map showing locations of RFID tags within a facility and/or changes to said locations in near real-time. In this regard, it should be understood that the electronic circuit can access and run a software application 422 installed on the server 400. The software application 422 is generally operative to facilitate the determination of RFID tag locations within a facility; the direction of travel of RFID tags in motion; and the mapping of the RFID tag locations and movements in a virtual three-dimensional space.

In those or other scenarios, the hardware entities 414 include an electronic circuit (e.g., a processor) programmed for facilitating item inventorying, merchandise sale, and/or customer satisfaction with a shopping experience. In this regard, the electronic circuit can access and run an inventorying software application 422 and an MCD display software application 422 installed on the server 400. The software applications 422 are collectively generally operative to: obtain item level information and/or other information from MCDs and RFID tags; program item level information, accessory information, related product information and/or discount information onto RFID tags and/or MCDs; convert the language, pricing and/or currency symbol of item level information, accessory information, related product information and/or discount information; facilitate registration of RFID tags and MCDs with an enterprise system; and/or determine when MCD display update actions need to be taken based on RFID tag information. Other functions of the software applications 422 will become apparent as the discussion progresses. Such other functions can relate to tag reader control and/or tag control.

Figure 5:
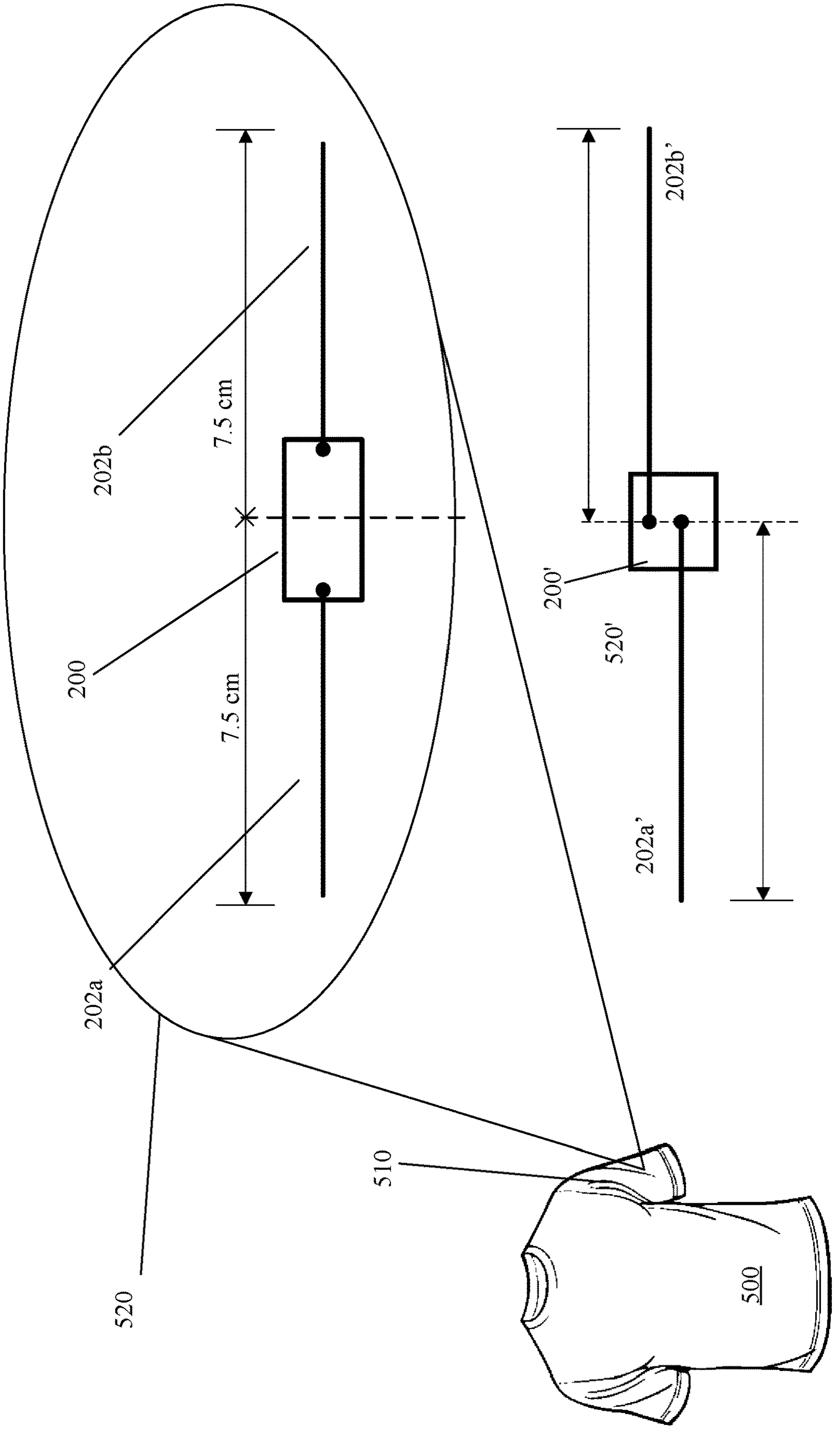
FIG. 5 is an item of electronic article surveillance, in accordance with examples of the technology disclosed herein.

Referring to FIG. 5, and continuing to refer to prior figures for context, an electronic article surveillance (EAS) enabled item is shown. The EAS-enabled item includes a textile element and an EAS element. In the continuing example of FIG. 5, the EAS-enabled item is a tee shirt 500 and the textile element is a sleeve panel 510 of the tee shirt 500. The EAS element is an RFID tag 520 (shown in exploded view), such as RFID tag 200. In other examples, the EAS-enabled item can be a backpack (with the textile element being a panel of the backpack), a shoe (with the textile element being the covering of the tongue of the shoe), or a piece of furniture (with the textile element being a section of the upholstery fabric). In other examples, the EAS element can be another type of EAS element, including an acousto-magnetic (AM) element or an electro-magnetic element.

EAS element of the EAS-enabled item includes an antenna subsystem (such as antenna 202) and EAS electronics 520 (such as RFID tag 200)—each as described in connection with FIG. 2). In the continuing example, the antenna subsystem 202 is dipole with two conductive elements 202*a*, 202*b*—though antenna configurations other than a dipole can also be used, including using two separate antennas (e.g., for the use of different RF ranges). In the continuing example, each antenna elements 202*a*, 202*b* of the dipole antenna 202 are each formed of a conductive thread. A typical such conductive thread is on the order of 50 micrometers-150 micrometers in diameter (for example 98 micrometers in diameter), and can be sheathed in a non-conductive layer that does not effectively impede the RF characteristics of the thread.

Each antenna element is integrated into the textile element, i.e., in a fashion not readily removed using conventional means for removing EAS tags, and in a fashion not readily removed without causing damage to the EAS-enabled item. In some examples, each antenna subsystem 202 element 202*a*, 202*b* is integrated into the textile element 510 by one of weaving, knitting, crocheting, knotting, tatting, felting, or braiding.

In the continuing example, dipole antenna elements 202*a*, 202*b* extend from the EAS electronics 200 in substantially opposite directions along a diametric line through the EAS electronics 200 and are each approximately 7 cm long. In another example 520', at least one of the two antenna elements 202*a*', 202*b*' is offset from each other or the diametric line through the EAS electronics 200'. It can be beneficial to integrate the antenna elements 202*a*, 202*b* into the fabric so that the antenna elements are likely to remain substantially straight and less susceptible to being kinked—for example, in a textile element 510 such as a sleeve panel that may move, but is not likely to bend much. While FIG. 5 illustrates a substantially horizontal integration of the EAS element 520 into sleeve panel 510 the EAS element 520 can be integrated into the sleeve panel 510 vertically to provide a substantially straight integration less likely to kink and bend. The cross section of each antenna subsystem element 202*a*, 202*b* can be rounded or rectangular.

The EAS element 200 is in conductive contact with each antenna element 202*a*, 202*b*, e.g., through a soldered connection. In some examples, the EAS element includes components such as a physiological sensor, a motion sensor 250, a location nodule 230, and an energy harvesting circuit 232.

Figure 6:
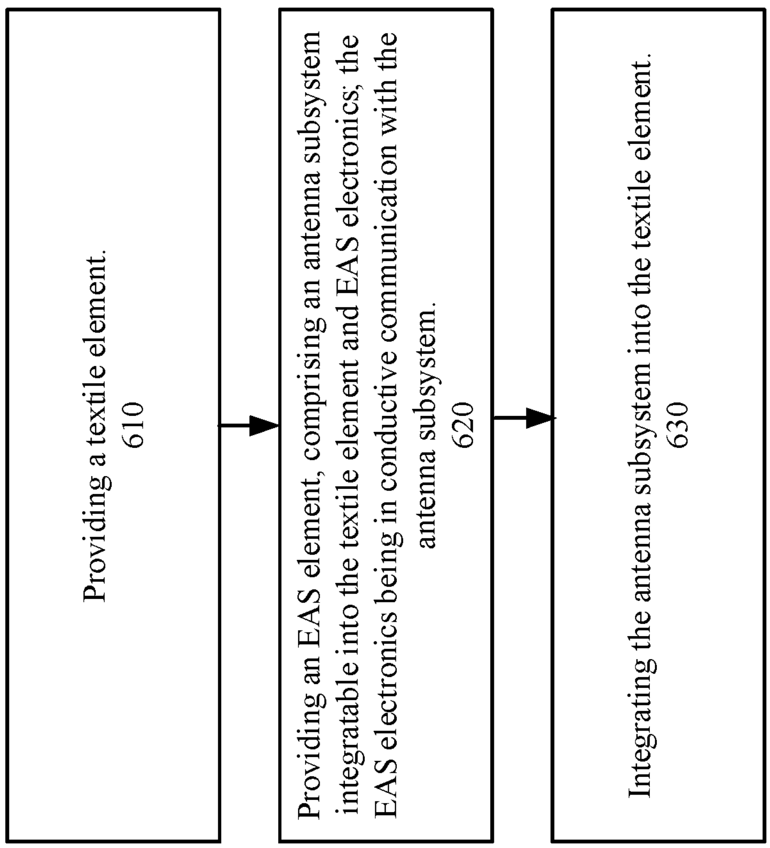
FIG. 6 is a flow chart of a method of electronic article surveillance, in accordance with examples of the technology disclosed herein.

Referring to FIG. 6, and continuing to refer to prior figures for context, a flowchart 600 for methods of electronic article surveillance (EAS). Such methods 600 include providing a textile element—Block 610 In the continuing example, textile element 510 is a sleeve panel 510 of tee shirt 500. Such methods 600 include providing an EAS element, comprising an antenna subsystem integratable into the textile element and EAS electronics; the EAS electronics being in conductive communication with the antenna subsystem—Block 620 In the continuing example, EAS element 520 is provided. EAS element 520 includes antenna subsystem 200, which is integratable into textile element 510 through (for example) one of weaving, knitting, crocheting, knotting, tatting, felting, or braiding. Each element 202*a*, 202*b* of antenna subsystem 200 is soldered to contact points on EAS electronics 200 and extends diametrically from the EAS electronics 200. Such methods 600 include integrating the antenna subsystem into the textile element—Block 630. In the continuing example, antenna subsystem 200 and, consequently, EAS electronics 200 are integrated into the textile element 510. Textile element 510 can be assembled into item 500. While the steps of methods 600 are illustrated in one possible order in the continuing example, other orders known to those of skill in the art may be used.

In further examples of the technology disclosed herein, providing electronic sensor tags can be incorporated into fabric that forms part of a garment. Electronics can be integrated into textiles using various methods. In one method, microelectronic components (such RFID chips) are attached to a fabric using conductive thread (e-thread) which is woven into the fabric. The e-thread provides the metal antenna for the RFIP chip. In another embodiment, a pattern of conductive ink can be applied to fabric to create electronic circuit including electronic components attached to the fabric. Yet another method allows fully-functional, self-contained electronic components to be entirely sheathed within a segment of thread or yarn. These segments of thread or yarn can be woven into the textiles. In one example, an RIFD chip, antennas, and associated energy-harvesting circuitry can be contained within a segment of thread or yarn. In still other examples, other loss prevention technologies can be contained within the portion of thread or yarn.

In some examples, a microelectronic chip can be integrated into a textile item. The chip is connected to two diametrically extending segments of conductive thread, such as that produced and sold by Elektrosola. The two conductive thread segments can be incorporated into the textile by a weaving or knitting process. The two conductive thread segments are secured to the electrical contacts of the chip to provide a good electrical connection. The two conductive thread segments should be inserted into the chip's housing (or other suitable structure) and secured therein in such a way that it encourages the mechanical stability of microelectronic chip with respect to the textile. The conductive metal or metallic segments (either threads or wires) can have either a flat or a round cross section.

In another configuration the microelectronic chip (such as the Monza R6-P tag chip) can be integrated into a textile item in a manner similar to that described above, except with the two segments of conductive thread being in a parallel, off-set arrangement.

The chip configurations shown in FIGS. 1 and 2 can be passive devices, e.g., powered by energy received from sources such as RFID readers. However, the technology disclosed herein is not limited to passive devices. A battery may be printed on the fabric layer for supplying power to the electronic thread device. Alternatively, a trace is formed on the fabric layer that connects the electronic thread device to an external power source located in the tag's body.

The examples described are integratable integrated into garments, for example by weaving into the fabric itself, and also into other items, such as handbags and shoes. In some examples, the RFID chip and conductive thread are selected from durable, waterproof materials, since the textile should be able to withstand laundering. The conductive thread is attached to the chip in a want that ensures that the assemblage, including the textile item itself, is mechanically robust.

The sensors and electronic circuitry to be incorporated into textile items are not limited to RFID elements and associated circuitry; various EAS technologies can be utilized, and the textile can include a separate EAS component. The EAS component may comprise a magnetic material disposed in a core layer of the tag's flexible elongate structure and a coil wrapped around at least one of the magnetic material and a fabric layer of the tag's flexible elongate structure. Alternatively, the EAS component comprises a resonator and bias element, or an RFID chip (passive or active).

In some examples, the portions of conductive thread are integrated/assimilated into the textile and also attached to the chip in a manner that ensures that they remain substantially straight, without a tendency of becoming bent or kinked. The electronics incorporated into the textile can enable any suitable radio communications protocol for a given mode of use, such as Short Range Communications ("SRC"), Near Field Communication ("NFC"), Bluetooth, ZigBee, etc. In accordance with the principles of the technology disclosed hereon, it is also contemplated that the use of other, additional technologies, such as a fiber optic approach, will allow the integration of other technologies into a small form with multi-sensor capability.

The textile items incorporating the electronic sensors arrangement described above can also include any number of sensors, which may or may not be electrically connected to one another. A textile item may be provided with motion detection sensors such as accelerometers, gyroscopes, and magnetometers to detect relative movement of the textile item.

The electronics embedded into the textile item can also provide an audio output and/or a visual output in response to one or more sensor signals. The textile items can also include sensors for detecting a physiological data from the wearer, such as heart rate. For garments, a sensor may be configured to sense a garment wearer's position (e.g. standing up or sitting). Sensors can be incorporated into a garment to sense the location of the wearer, the wearer's movement pattern (e.g. running or standing still), and physiological status. These sensors can include, but not limited to, a capacitive strain sensor, a conductive media (conductive ink) capacitive sensor, a conductive media (conductive ink) electrode sensor, a conductive media (conductive ink) resistive sensor, a fiber optic sensor, a metal electrode sensor, an optical sensor such as an optical probe sensor or an optical source sensor (e.g., a laser, a light emitting diode (LED), etc.), a piezo resistive strain gauge sensor, a semiconductor sensor (e.g., a force sensor, a gyroscope, a magneto-resistor sensor, a photodiode sensor, a phototransistor sensor, a pressure sensor, and/or a tri-axis accelerometer). The electronics embedded in the textile item can also include one or more interactive sensors that are responsive to touch. An interactive sensor may be made from any material in an arrangement that that allows the sensor to be triggered contact (such as a human hand).

The additional sensors can be coupled to the microelectronic chip(s) in a networked arrangement within the garment or other textile. In this way, the chip(s) can function as a central communications module for all sensors that are embedded in the garment. Data based on sensor output can transmitted by the chip to an external device, or data can be sent to the chip from an external device to facilitate operation of the sensors. Additionally, one or more of the sensors can have their own subsystems for radio communications. It is also contemplated that in the presence of a power inducing field, the embedded electronics in a first garment can be in communication with one or more other items having similar capabilities, or could otherwise be in communication with a central processor.

Example 1 of the technology disclosed herein, includes EAS-enabled item, including a textile element, and an EAS element. The EAS element includes an antenna subsystem integrated into the textile element; and EAS electronics, in conductive communication with the antenna subsystem.

Example 2 includes Example 1 wherein the antenna subsystem comprises two antenna elements extending from the EAS electronics in substantially opposite directions along a diametric line through the EAS electronics, and each antenna element is integrated into the textile element by one of weaving, knitting, crocheting, knotting, tatting, felting, or braiding. Example 3 includes any one or more of Examples 1-2, wherein one of the two antenna elements is offset from the diametric line. Example 4 includes any one or more of Examples 1-3, wherein the EAS element comprises a radio frequency identification (RFID) element. Example 5 includes any one or more of Examples 1-4 wherein the EAS element comprises at least one sensor from among: a physiological sensor, a motion sensor, and a location sensor. Example 6 includes any one or more of Examples 1-5 wherein the EAS element comprises an energy harvesting subsystem.

Example 7 of the technology disclosed herein, includes a textile including an EAS element. The EAS element includes an antenna subsystem integrated into the textile; and EAS electronics, in conductive communication with the antenna subsystem. Example 8 includes Example 7 wherein the antenna subsystem comprises two antenna elements extending from the EAS electronics in substantially opposite directions along a diametric line through the EAS electronics, and each antenna element is integrated into the textile by one of weaving, knitting, crocheting, knotting, tatting, felting, or braiding. Example 9 includes any one or more of Examples 7-8, wherein one of the two antenna elements is offset from the diametric line. Example 10 includes any one or more of Examples 7-9, wherein the EAS element comprises a radio frequency identification (RFID) element. Example 11 includes any one or more of Examples 7-10 wherein the EAS element comprises at least one sensor from among: a physiological sensor, a motion sensor, and a location sensor. Example 12 includes any one or more of Examples 7-11 wherein the EAS element comprises an energy harvesting subsystem.

Example 13 includes methods of EAS, including providing a textile element and providing an EAS element. The EAS element includes an antenna subsystem integratable into the textile element and EAS electronics. The EAS electronics are in conductive communication with the antenna subsystem. The method includes integrating the antenna subsystem into the textile element. Example 14 includes the methods of Example 13 wherein the antenna subsystem comprises two antenna elements extending from the EAS electronics in substantially opposite directions along a diametric line through the EAS electronics, and each antenna element is integrated into the textile element by one of weaving, knitting, crocheting, knotting, tatting, felting, or braiding. Example 15 includes the methods of any one or more of Examples 13-14 wherein one of the two antenna elements is offset from the diametric line. Example 16 includes the methods of any one or more of Examples 13-15 herein the EAS element comprises a radio frequency identification (RFID) element. Example 17 includes the methods of any one or more of Examples 13-16 wherein the EAS element comprises at least one sensor from among: a physiological sensor, a motion sensor, and a location sensor. Example 18 includes the methods of any one or more of Examples 13-17 wherein the EAS element comprises an energy harvesting subsystem.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An electronic article surveillance (EAS) enabled item, comprising:

a textile element;

a radio frequency identification (RFID) element; and an EAS element configured to communicate with an inventory management system, the EAS element comprising:

an antenna subsystem integrated into the textile element; and

EAS electronics, in communication with the antenna subsystem;

wherein the antenna subsystem comprises two dipole antenna elements each extending from the EAS electronics in corresponding opposite directions from a diametric line through the EAS electronics, and wherein the two dipole antenna elements each extend from a corresponding opposite side of the diametric line, wherein the EAS element comprises an energy harvesting subsystem configured to harvest energy from at least two of heat, light, vibration, magnetic field, or RF energy.

2. The item of claim 1, wherein:

each antenna element is integrated into the textile element by one of weaving, knitting, crocheting, knotting, tatting, felting, or braiding.

3. The item of claim 2, wherein one of the two dipole antenna elements is offset from the diametric line.

4. The item of claim 1, wherein the EAS element comprises at least one sensor from among: a physiological sensor, a motion sensor, or a location sensor.

5. A textile, comprising:

a radio frequency identification (RFID) element; and an EAS element configured to communicate with an inventory management system, the EAS element comprising:

an antenna subsystem integrated into the textile; and

EAS electronics, in communication with the antenna subsystem:

wherein the antenna subsystem comprises two dipole antenna elements each extending from the EAS electronics in corresponding opposite directions from a diametric line through the EAS electronics, and wherein the two dipole antenna elements each extend from a corresponding opposite side of the diametric line, wherein the EAS element comprises an energy harvesting subsystem configured to harvest energy from at least two of heat, light, vibration, magnetic field, or RF energy.

6. The textile of claim 5, wherein:

each antenna element is integrated into the textile by one of weaving, knitting, crocheting, knotting, tatting, felting, or braiding.

7. The textile of claim 6, wherein at least one of the two dipole antenna elements is offset from the diametric line.

8. The textile of claim 5, wherein the EAS element comprises at least one sensor from among: a physiological sensor, a motion sensor, or a location sensor.

9. A method of Electronic Article Surveillance (EAS), comprising:

providing a textile element;

providing a radio frequency identification (RFID) element;

providing an EAS element configured to communicate with an inventory management system, comprising an antenna subsystem integratable into the textile element and EAS electronics, in communication with the antenna subsystem; and integrating the antenna subsystem into the textile element:

wherein the antenna subsystem comprises two dipole antenna elements each extending from the EAS electronics in corresponding opposite directions from a diametric line through the EAS electronics, and wherein the two dipole antenna elements each extend from a corresponding opposite side of the diametric line, wherein the EAS element comprises an energy harvesting subsystem configured to harvest energy from at least two of heat, light, vibration, magnetic field, or RF energy.

10. The method of claim 9, wherein:

each antenna element is integrated into the textile element by one of weaving, knitting, crocheting, knotting, tatting, felting, or braiding.

11. The method of claim 10, wherein one of the two dipole antenna elements is offset from the diametric line.

12. The method of claim 9, wherein the EAS element comprises at least one sensor from among: a physiological sensor, a motion sensor, or a location sensor.

* * * * *